(12) United States Patent
Maltsev et al.

(10) Patent No.: US 10,651,908 B2
(45) Date of Patent: May 12, 2020

(54) APPARATUS, SYSTEM AND METHOD OF BEAMFORMING

(71) Applicant: INTEL CORPORATION, Santa Clara, CA (US)

(72) Inventors: Alexander Maltsev, Nizhny Novgorod (RU); Artyom Lomayev, Nizhny Novgorod (RU); Carlos Cordeiro, Portland, OR (US); Assaf Kasher, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/766,947

(22) PCT Filed: Mar. 30, 2016

(86) PCT No.: PCT/US2016/024892
§ 371 (c)(1),
(2) Date: Apr. 9, 2018

(87) PCT Pub. No.: WO2017/078780
PCT Pub. Date: May 11, 2017

(65) Prior Publication Data
US 2018/0302137 A1    Oct. 18, 2018

Related U.S. Application Data

(60) Provisional application No. 62/251,283, filed on Nov. 5, 2015.

(51) Int. Cl.
*H04B 7/06* (2006.01)
*H04B 7/08* (2006.01)
*H04B 7/0413* (2017.01)

(52) U.S. Cl.
CPC ......... *H04B 7/0617* (2013.01); *H04B 7/0413* (2013.01); *H04B 7/0695* (2013.01); *H04B 7/088* (2013.01)

(58) Field of Classification Search
CPC .. H04B 7/0617; H04B 7/0413; H04B 7/0695; H04B 7/088
See application file for complete search history.

(56) References Cited

U.S. PATENT DOCUMENTS 8,644,184 B1    2/2014  Zhang et al.
2013/0301454 A1*  11/2013  Seol ........................ H04B 7/043
                                                          370/252

(Continued)

FOREIGN PATENT DOCUMENTS

WO    2010095061    8/2010

OTHER PUBLICATIONS

"Enhancements for Very High Throughput in the 60GHz Band," IEEE 802.11ad-standard, Dec. 28 (Year: 2012).*

(Continued)

*Primary Examiner* — Sam K Ahn
*Assistant Examiner* — Amneet Singh
(74) *Attorney, Agent, or Firm* — Shichrur & Co.

(57) ABSTRACT

For example, an apparatus may include logic and circuitry configured to cause a first wireless station to perform a Transmit Sector Sweep (TXSS) protocol with a second wireless station over a directional frequency band using a plurality of antennas of the first wireless station, an antenna of the plurality of antennas of the first wireless station comprising a plurality of sectors; to perform a Receive Sector Sweep (RXSS) protocol with the second wireless station over the directional frequency band using the plurality of antennas of the first wireless station; and, based on the TXSS and RXSS protocols, to configure the plurality of (Continued)

antennas of the first wireless station to communicate a Single-User (SU) Multiple-Input-Multiple-Output (MIMO) transmission with the second wireless station.

20 Claims, 12 Drawing Sheets

(56) References Cited

U.S. PATENT DOCUMENTS

2014/0126620 A1     5/2014    Maltsev et al.
2014/0210666 A1     7/2014    Maltsev et al.

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and the Written Opinion for International Application No. PCT/US2016/024892, dated Jul. 26, 2016, 12 pages.

IMC et al., 'WP4: Radio Resource Management for mm-wave Overlay HetNets', D4.1: System Level Simulator Specification, MiWEBA, EU Contract No. FP7-ICT-608637, pp. 1-64, Dec. 2014.

International Preliminary Report on Patentability for International Application No. PCT/US20161024892, dated May 17, 2018, 9 pages.

* cited by examiner

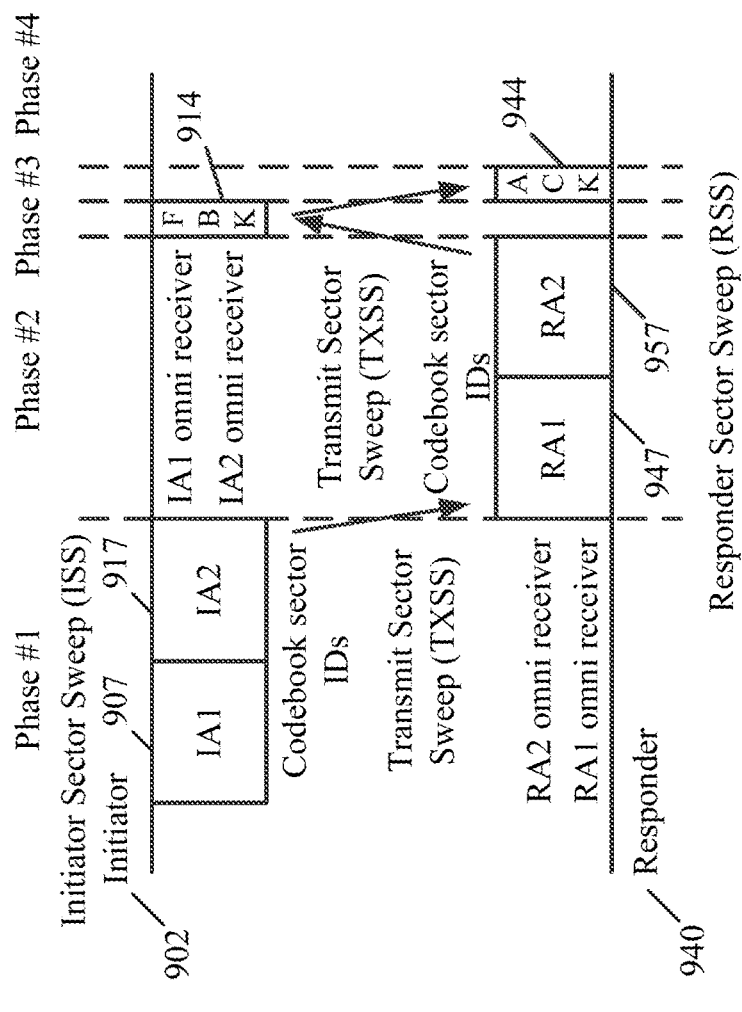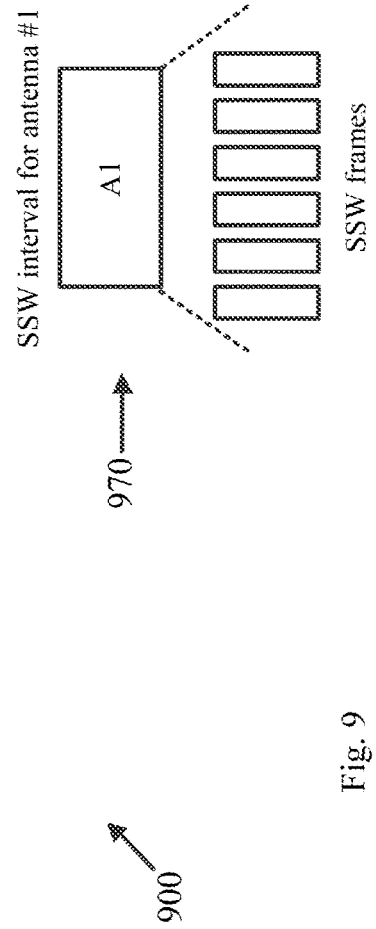
Fig. 9

APPARATUS, SYSTEM AND METHOD OF BEAMFORMING

CROSS REFERENCE

This Application claims the benefit of and priority from U.S. Provisional Patent Application No. 62/251,283 entitled "APPARATUS, SYSTEM AND METHOD OF BEAMFORMING", filed Nov. 5, 2015, the entire disclosure of which is incorporated herein by reference.

TECHNICAL FIELD

Embodiments described herein generally relate to beamforming.

BACKGROUND

A wireless communication network in a millimeter-wave band may provide high-speed data access for users of wireless communication devices.

A beamforming procedure may be configured to steer a first directional antenna of a first wireless communication device, e.g., a beamforming initiator (BI), and a second directional antenna of a second wireless communication device, e.g., a beamforming responder (BR). The beamforming procedure may be performed, for example, to establish a high throughout communication link between the BI and the BR, e.g., at an acceptable communication range between the BR and the BI.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 9 is a schematic illustration of an SLS TXSS protocol, in accordance with some demonstrative embodiments.

DETAILED DESCRIPTION

Figure 1:
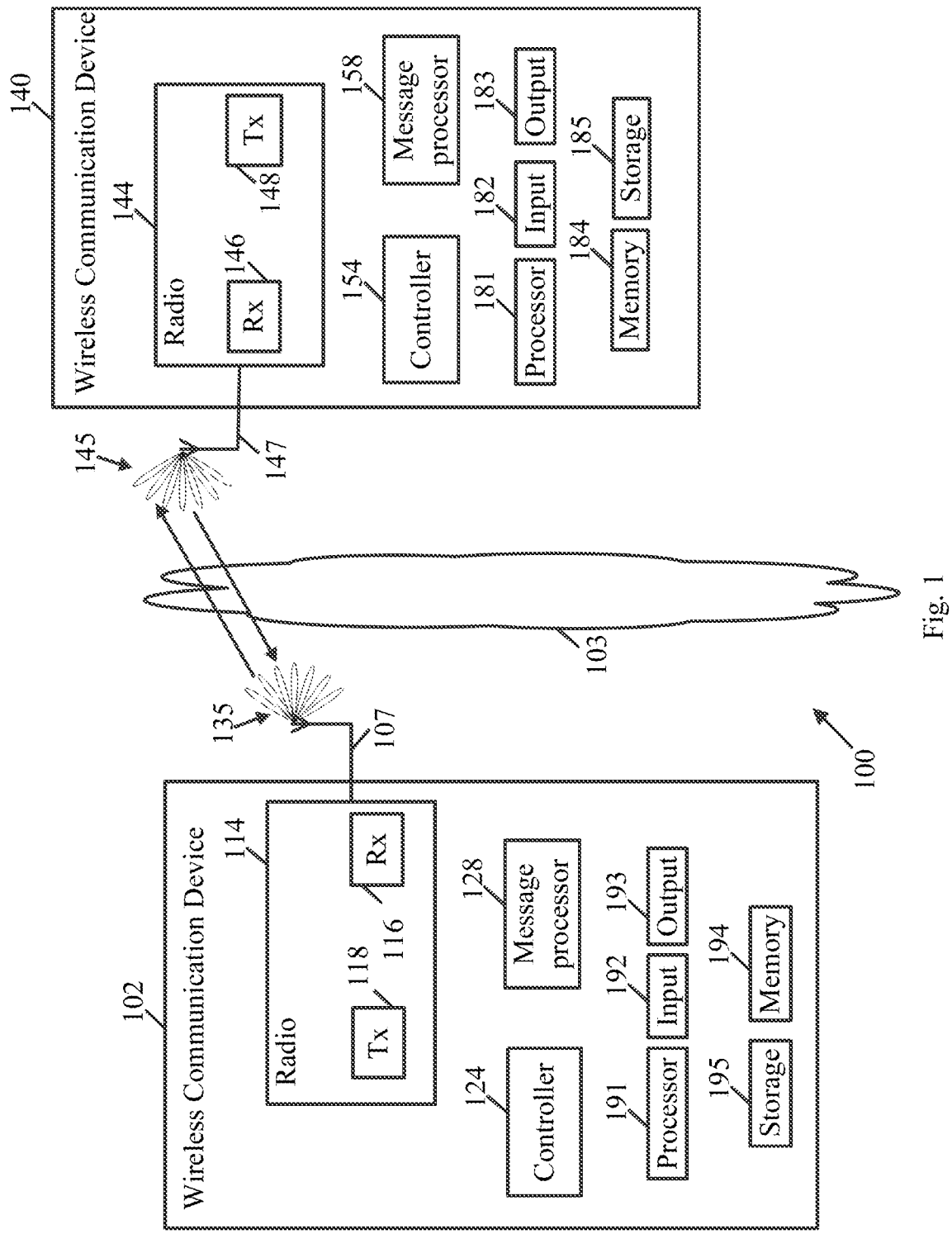
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE*802.11*ac*-2013 ("*IEEE P*802.11*ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); *IEEE* 802.11*ad* ("*IEEE P*802.11*ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with existing WiFi Alliance (WFA) Peer-to-Peer (P2P) specifications (including *WiFi P2P technical specification, version* 1.5, Aug. 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, April 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "millimeter-wave (mmWave) STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, wireless communication devices 102 and/or 140 may include a mobile device or a non-mobile, e.g., a static, device.

For example, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel in a directional frequency band. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations (STA), e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WiFi STA, and the like.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radio 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, radios 114 and/or 144 may include, or may be associated with, a plurality of directional antennas.

In some demonstrative embodiments, device 102 may include a plurality of directional antennas 107, and/or device 140 may include a plurality of directional antennas 147.

In one example, antennas 107 may include two directional antennas, and/or antennas 147 may include two directional antennas.

In another example, antennas 107 may include more than two directional antennas, and/or antennas 147 may include more than two directional antennas.

In another example, antennas 107 may include two or more directional antennas and/or antennas 147 may include two or more directional antennas.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/ or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, an antenna 107 may include directional antennas, which may be steered to a plurality of beam directions ("sectors") 135.

In some demonstrative embodiments, an antenna 147 may include directional antennas, which may be steered to a plurality of sectors 145.

In some demonstrative embodiments, the antenna 107 and/or the antenna 147 may include and/or may be implemented as part of a single Phased Antenna Array (PAA).

In some demonstrative embodiments, the antenna 107 and/or the antenna 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, system 100 may include a beamforming initiator (BI) and a beamforming responder (BR) to perform beamforming between the BI and the BR. For example, wireless communication device 102 may perform the functionality of the BI, and/or wireless communication device 140 may perform the functionality of the BR.

In other embodiments, wireless communication device 140 may perform the functionality of the BI, and/or wireless communication device 102 may perform the functionality of the BR.

In some demonstrative embodiments, a beamforming procedure may be configured to steer a first directional antenna of a first wireless communication device, e.g., the BI, and a second directional antenna of a second wireless communication device, e.g., the BR. The beamforming procedure may be performed, for example, to establish a high throughput communication link between the BI and the BR, e.g., at an acceptable communication range between the BR and the BI.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

Some demonstrative embodiments may be implemented, for example, as part of a new standard in an mmWave band, e.g., a 60 GHz frequency band or any other directional band, for example, as an evolution of an IEEE 802.11ad standard.

In some demonstrative embodiments, devices 102 and/or 140 may be configured according to one or more standards, for example, in accordance with an IEEE 802.11 ay Standard, which may be, for example, configured to enhance the efficiency and/or performance of an IEEE 802.11ad Specification, which may be configured to provide WiFi connectivity in a 60 GHz band.

Some demonstrative embodiments may enable, for example, to significantly increase the data transmission rates defined in the IEEE 802.11ad specification, for example, from 7 Gbps, e.g., up to 30 Gbps, or to any other data rate, which may, for example, satisfy growing demand in network capacity for new coming applications.

Some demonstrative embodiments may be implemented, for example, to allow increasing a transmission data rate, for example, by applying Multiple Input Multiple Output (MIMO) and/or channel bonding techniques.

In some demonstrative embodiments, the IEEE 802.11ad-2012 Specification may be configured to support a Single User (SU) system, in which a Station (STA) may transmit frames to a single STA at a time.

Some demonstrative embodiments may enable, for example, communication in one or more use cases, which may include, for example, a wide variety of indoor and/or outdoor applications, including but not limited to, for example, at least, high speed wireless docking, ultra-short range communications, 8K Ultra High Definition (UHD) wireless transfer at smart home, augmented reality headsets and high-end wearables, data center inter-rack connectivity, mass-data distribution or video on demand system, mobile offloading and multi-band operation, mobile front-hauling, and/or wireless backhaul.

In some demonstrative embodiments, a communication scheme may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, Single User (SU) techniques, and/or Multi User (MU) MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, devices 102 and/or 140 may be configured to communicate MIMO communications over the mmWave wireless communication band.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

In some demonstrative embodiments, devices 102 and/or 140 may be configured to implement one or more techniques, which may, for example, enable to support communications over a MIMO communication channel, e.g., a SU-MIMO channel between two mmWave STAs.

In some demonstrative embodiments, communication over a DMG band, for example, a 60 GHz band may be directional.

In some demonstrative embodiments, a beamforming (BF) link between two stations (STAs), e.g., devices 102 and 140, may be established, for example, before data communication between the two STAs.

In some demonstrative embodiments, device 102 may select a first sector of a first antenna 107 and a second sector of a second antenna 107, e.g., if antennas 107 include two directional antennas, for example, to communicate between devices 102 and 140 via a mmWave wireless communication link, for example, according to a MIMO scheme, for example, a 2×2 MIMO scheme, e.g., a SU-MIMO scheme.

In some demonstrative embodiments, device 140 may select a first sector of a first antenna 147 and a second sector of a second antenna 147, e.g., it antennas 147 include two directional antennas, for example, to communicate between devices 102 and 140 via a mmWave wireless communication link, for example, according to a MIMO scheme, for example, a 2×2 MIMO scheme, e.g., a SU-MIMO scheme.

In some demonstrative embodiments, devices 102 and/or 140 may perform a Beamforming procedure (also refereed to as "beamforming training protocol" or "beamforming protocol") including a Sector level sweep (SLS) phase or protocol, e.g., including, for example, an Initiator Sector Sweep (ISS), which may include a sector sweep performed, for example, by the Beamforming initiator, and a responder sector sweep (RSS), which may include a sector sweep performed, for example, by the Beamforming responder. In one example, the RSS may, for example, follow the ISS, e.g., as described below.

In some demonstrative embodiments, a Sector Level Sweep (SLS) protocol may be configured to perform beamforming training of the initiator and responder Antenna Weight Vectors (AWVs) to set up a directional link, for example, as an inherent part of communication systems operating in the 60 GHz band.

Some SLS protocols (also referred to as "legacy SLS protocols" or "SISO SLS protocols"), for example, the SLS protocol defined by the IEEE 802.11ad Specification, may be configured for a Single Input Single Output (SISO) system only. Such legacy SLS protocols may not be able to provide, for example, a solution for MIMO training, e.g., for SU-MIMO.

In some demonstrative embodiments, devices 102 and/or 140 may be configured to perform a SU-MIMO SLS beamforming protocol. The SU-MIMO SLS protocol may be implemented, for example, in a future Specification, for example, an IEEE 802.11ay Specification.

In some demonstrative embodiments, devices 102 and/or 140 may be configured to perform an SLS protocol, which may include Transmit Sector Sweep (TXSS) and/or Receive Sector Sweep (RXSS) training, e.g., as described below.

In some demonstrative embodiments, the SLS protocol may be configured to allow at least SU-MIMO beamforming training, for example, in contrast to and/or in addition to the legacy IEEE 802.11ad protocol, which may allow only SISO training.

In some demonstrative embodiments, an SLS protocol may be configured to perform the TXSS and/or RXSS beamforming training of one or more MIMO schemes, for example, one or more SU-MIMO schemes, for example, one or more SU-MIMO schemes, which are not supported by a legacy SLS protocol, e.g., SU-MIMO schemes not supported by the legacy IEEE 802.11ad Specification.

In some demonstrative embodiments, devices 102 and/or 140 may be configured to perform a TXSS beamforming protocol according to at least a first implementation option and/or a second implementation option, which may be configured to allow to find best TX sectors, e.g., at least for a SU-MIMO configuration.

In some demonstrative embodiments, the first implementation option ("Option #1") may be configured in a manner, which may be, for example, at least partially compatible with a legacy protocol, e.g., a legacy IEEE 802.11ad protocol, for example, except for a feedback on the best selected sectors, e.g., as described below.

In some demonstrative embodiments, the second implementation option ("Option #2") may be configured to include one or more new features, which may, for example, allow simultaneous reception of a frame by all RX antennas, which may enable, for example, to reduce the time of the SLS protocol, e.g., as described below.

In some demonstrative embodiments, devices 102 and/or 140 may be configured to perform an RXSS protocol, which may include one or more new features, e.g., not supported by legacy SLS protocols, e.g., not supported by the legacy IEEE 802.11ad standard.

In some demonstrative embodiments, devices 102 and/or 140 may be configured to perform an RXSS protocol, for example, according to at least a first implementation option and/or a second implementation option, e.g., as for the TXSS protocol.

In some demonstrative embodiments, the RXSS protocol may be configured to allow finding the best RX sectors, e.g., at least for an SU-MIMO configuration.

Following is a description of TXSS and RXSS SLS beamforming protocols, which may be configured for a SISO configuration, e.g., in accordance with an IEEE 802.11ad Specification.

Figure 2:
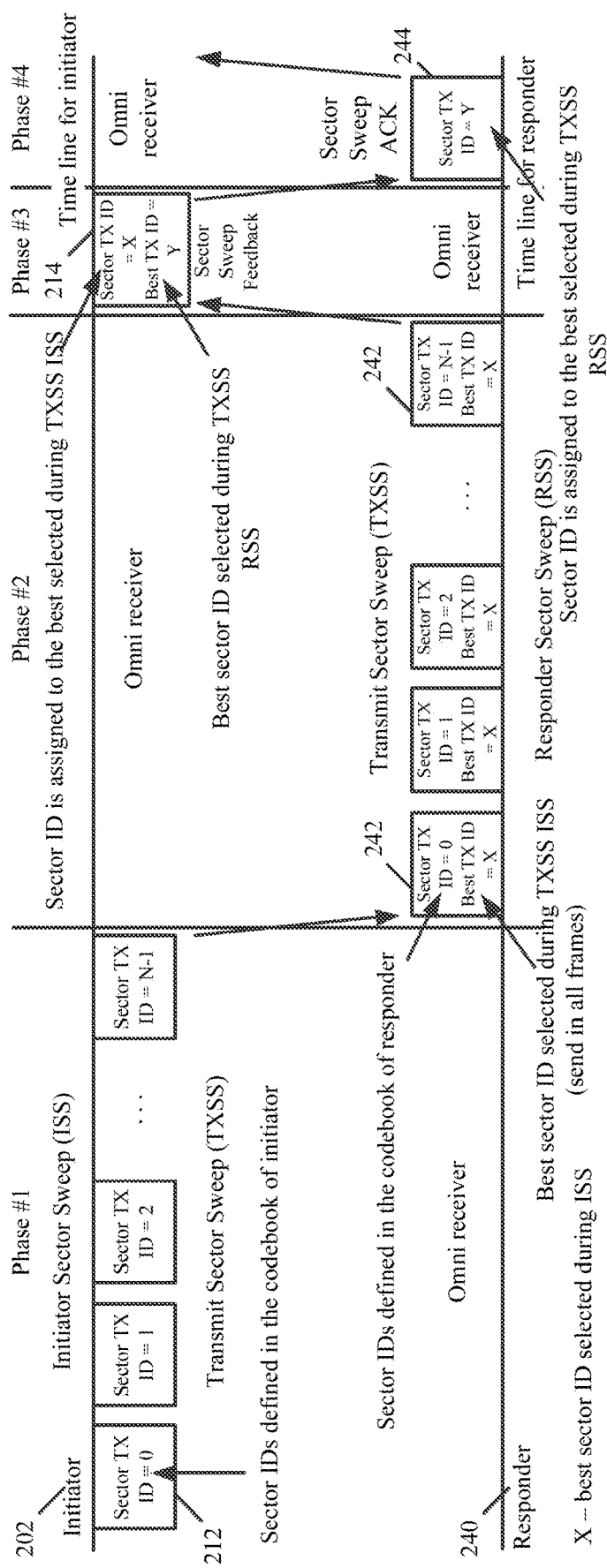
FIG. 2 is a schematic illustration of a Sector level Sweep (SLS) Transmit Sector Sweep (TXSS) protocol for a Single Input Single Output (SISO) configuration.

Reference is made to FIG. 2, which is schematically illustrates an SLS TXSS protocol 200 for a SISO configuration, e.g., in accordance with an IEEE 802.11ad Specification.

The TXSS protocol 200 may be configured to establish a SISO directional link between two stations (STAs), for example, a first station, e.g., an initiator 202, which may commence a frame exchange, and a second station e.g., a responder 240, which may respond to a request from the initiator 202.

As shown in FIG. 2, the TXSS protocol 200 may include 4 phases, denoted Phase #1, Phase #2, Phase #3, and Phase #4.

As shown in FIG. 2, the first phase may include an Initiator Sector Sweep (ISS), during which the initiator 202 may send a beacon or Sector Sweep (SSW) Frames 212 to responder 240.

An SSW frame 212 may be transmitted using a Control PHY. Each SSW frame 212 may be sent by applying a different AWV, for example, including a predefined codebook.

A number of SSW frames 212 may be, for example, equal to the total number of TX antenna sectors of initiator 202.

As shown in FIG. 2, responder 240 may receive the SSW frames 212, for example, using an Omni antenna of responder 240.

The responder 240 may be aware of an index of a current SSW frame 212, a total number of SSW frames 212 to be transmitted, and/or a number of remaining SSW frames 212 to be transmitted during the ISS.

As shown in FIG. 2, the second phase may include a Responder Sector Sweep (RSS), during which the responder 240 may send SSW Frames 242 to initiator 202, e.g., in a similar manner to the ISS of the first phase.

As shown in FIG. 2, an SSW frame 242 may include information of the best Tx sector ID of initiator 202, which was found during the ISS, e.g., of the first phase. For example, the best Tx sector ID of initiator 202 may be ID "X".

As shown in FIG. 2, initiator 202 may receive SSW frames 242, for example, using an Omni antenna of initiator 202.

The initiator 202 may be aware of an index of a current SSW frame 242, a total number of SSW frames 242 to be transmitted, and/or a number of remaining SSW frames 242 to be transmitted during the RSS.

As shown in FIG. 2, the third phase may include transmission of an SSW-Feedback frame 214 from the initiator 202 to the responder 240.

As shown in FIG. 2, SSW-Feedback frame 214 may be transmitted via the best Tx sector of initiator 202, e.g., as received in SSW frames 242 during the second phase, for example, via the sector having the ID "X".

As shown in FIG. 2, SSW-Feedback frame 214 may include information of the best sector ID of responder 240, which was found during the RSS of the second phase. For example, SSW-Feedback frame 214 may include information that the best sector ID of responder 240 is "Y".

As shown in FIG. 2, initiator 202 may receive SSW-Feedback frame 214, for example, using an Omni antenna of responder 240.

As shown in FIG. 2, the fourth phase may include transmission of an SSW Acknowledgement (Ack) frame 244 from the responder 240 to initiator 202.

As shown in FIG. 2, SSW-Ack frame 244 may be transmitted via the best Tx sector of responder 240, e.g., as received in SSW-Feedback frame 214 during the third phase for example, via the Tx sector having the ID "Y".

As shown in FIG. 2, initiator 202 may receive SSW-Ack frame 244, for example, using an Omni antenna of initiator 202.

At the end of protocol 200, both initiator 202 and responder 240 may have the best TX sectors, which may be used for frame transmission. For example, the best selected sector ID for the initiator 202 may be ID="X", and the best selected sector ID for Responder may be ID="Y".

Figure 3:
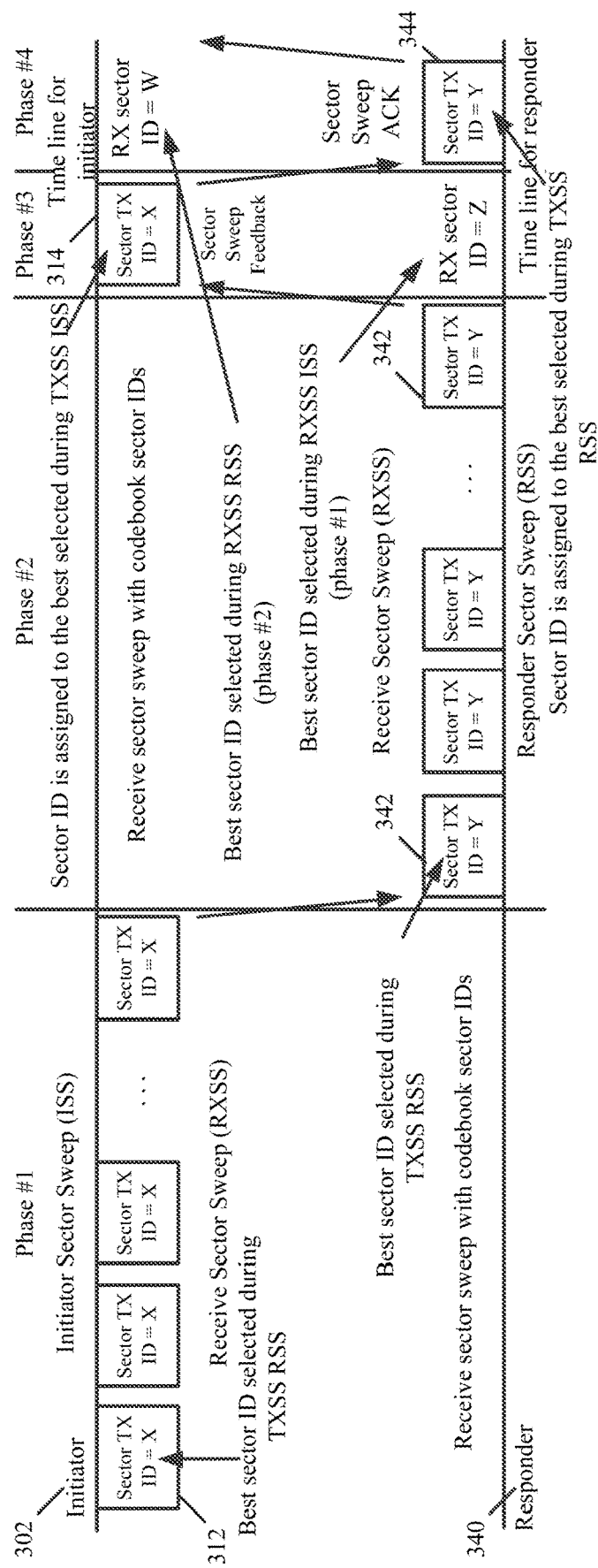
FIG. 3 is a schematic illustration of a Sector level Sweep (SLS) Receive Sector Sweep (RXSS) protocol for the SISO configuration.

Reference is made to FIG. 3, which schematically illustrates an SLS Receive Sector Sweep (RXSS) protocol 300 for the SISO configuration, e.g., in accordance with an IEEE 802.11ad Specification.

For example, the RXSS protocol 300 may be configured to allow finding the best Rx sectors. For example, although during the TXSS stage, both an initiator and a responder may optimize their Tx sectors, the initiator and responder may also be required to optimize the Rx sectors.

As shown in FIG. 3, the RXSS protocol 300 may include 4 phases, denoted Phase #1, Phase #2, Phase #3 and Phase #4, which may be at least partially similar to TXSS protocol 200 (FIG. 2).

As shown in FIG. 3, the first phase may include an ISS, during which the initiator 302 may send SSW frames 312 to responder 340.

An SSW frame 312 may be transmitted using a Control PHY.

As shown in FIG. 3, each SSW frame 312 may be sent using the best Tx sector ID of initiator 302, which was selected in TXSS protocol 200 (FIG. 2) during the first stage, for example, via the TX sector "X".

A number of SSW frames 312 may be, for example, equal to the total number of RX antenna sectors of responder 340.

The initiator 302 may be aware, e.g., in advance, of capabilities of the responder 340. For example, the initiator 302 may be aware of a total number of RX sectors of responder 340

As shown in FIG. 3, responder 340 may receive the SSW frames 312, for example, by performing the RXSS, e.g., switching between different AWVs, for example, including the predefined codebook.

The responder 340 may determine an ID of the best RX sector of responder 340, e.g., after completing the RXSS of the first phase. For example, the responder 340 may determine the RX sector "Z" as the best RX sector.

As shown in FIG. 3, the second phase may include an RSS, during which the responder 340 may transmit SSW Frames 342 to initiator 302, e.g., in a similar manner to the ISS of the first phase.

As shown in FIG. 3, each SSW frame 342 may be sent via the best Tx sector ID of responder 340, which was selected in TXSS protocol 200 (FIG. 2) during the second phase, for example, via the TX sector "Y".

As shown in FIG. 3, initiator 302 may receive the SSW frames 342, for example, by performing the RXSS, e.g., switching between different AWVs, for example, including the predefined codebook.

The initiator 302 may determine an ID of the best RX sector of initiator 302, e.g., after completing the RXSS of the second phase. For example, the initiator 302 may determine the RX sector "W" as the best RX sector.

As shown in FIG. 3, the third phase may include transmission of an SSW-Feedback frame 314 from the initiator 302 to the responder 340.

As shown in FIG. 3, SSW-Feedback frame 314 may be transmitted via the best Tx sector of initiator 302, for example, via the sector having the ID "X".

As shown in FIG. 3, responder 340 may receive SSW-Feedback frame 314, for example, via the best RX sector ID of responder 340, which was selected during the ISS RXSS in the first phase, for example, via the RX sector "Z".

As shown in FIG. 3, the fourth phase may include transmission of an SSW Ack frame 344 from the responder 340 to initiator 302.

As shown in FIG. 3, SSW-Ack frame 344 may be transmitted via the best Tx sector of responder 340, for example, via the Tx sector having the ID "Y".

As shown in FIG. 3, initiator 302 may receive SSW-Ack frame 344, for example, via the best RX sector ID of initiator 302, which was selected during the ISS RXSS in the second, for example, via the RX sector "W".

At the end of RXSS protocol 300, both initiator 302 and responder 340 may have the best RX sectors, which may be used for frame reception. For example, the best selected RX sector ID for the initiator 302 may be ID="W", and the best selected RX sector ID for responder 340 may be ID="Z".

An initiator and a responder may both have, e.g., after completion of protocol 200 (FIG. 2) and protocol 300, the best TX sector and the best RX sector, which may be used for frame transmission and reception.

Referring back to FIG. 1, in some demonstrative embodiments devices 102 and/or 140 may be configured to perform an SLS protocol (also referred to as an "enhanced SLS protocol" or "SU-MIMO SLS protocol"), which may be configured, for example, for SU-MIMO, e.g., as described below.

In some demonstrative embodiments, the SU-MIMO SLS protocol may utilize, implement, include, and/or may be based on, one or more operations of the protocol 200 (FIG. 2) and/or the protocol 300 (FIG. 3), e.g., as described below.

In some demonstrative embodiments, devices 102 and/or 140 may be configured to perform the SLS according to at least a first implementation option (option #1) and/or a second implementation option (option #2), e.g., as described below.

In some demonstrative embodiments, the first and second implementation options of the SLS protocol may include a TXSS protocol and an RXSS protocol, e.g., as described below.

In some demonstrative embodiments, devices 102 and 140 may be configured to perform the TXSS protocol and the RXSS protocol, e.g., as described below.

In some demonstrative embodiments, controller 124 may be configured to cause, trigger, and/or control device 102 to perform the TXSS protocol with device 140 over a directional frequency band using the plurality of antennas 107.

In some demonstrative embodiments, an antenna 107 of the plurality of antennas 107 of device 102 may include the plurality of sectors 135, e.g., as described above.

In some demonstrative embodiments, controller 124 may be configured to cause, trigger, and/or control device 102 to perform the RXSS protocol with device 140 over the directional frequency band using the plurality of antennas 107.

In some demonstrative embodiments, controller 154 may be configured to cause, trigger, and/or control device 140 to perform the TXSS protocol with device 102 over the directional frequency band using the plurality of antennas 147.

In some demonstrative embodiments, an antenna 147 of the plurality of antennas 147 of device 140 may include the plurality of sectors 145, e.g., as described above.

In some demonstrative embodiments, controller 154 may be configured to cause, trigger, and/or control device 140 to perform the RXSS protocol with device 102 over the directional frequency band using the plurality of antennas 147.

In some demonstrative embodiments, controller 124 may be configured to cause, trigger, and/or control device 102 to configure the plurality of antennas 107 to communicate an SU-MIMO transmission with device 140, e.g., as described below.

In some demonstrative embodiments, controller 154 may be configured to cause, trigger, and/or control device 140 to configure the plurality of antennas 147 to communicate the SU-MIMO transmission with device 102, e.g., as described below.

In some demonstrative embodiments, the plurality of antennas 147 may include 2 antennas, and/or the plurality of antennas 147 may include 2 antennas. In other embodiments, the plurality of antennas 107 and/or 147 may include any other number of antennas, e.g., equal to or greater than two.

In some demonstrative embodiments, the SU-MIMO transmission may include a 2×2 MIMO transmission. In other embodiments, the SU-MIMO transmission may include a MIMO transmission according to any other MIMO scheme, e.g., any other N×M MIMO transmission.

In some demonstrative embodiments, the TXSS protocol may include a TXSS initiator sector sweep (ISS) phase of an initiator station, and a TXSS responder sector sweep (RSS) phase of a responder station.

In some demonstrative embodiments, the RXSS protocol may include an RXSS ISS phase of the initiator station, and an RXSS RSS phase of the responder station.

In some demonstrative embodiments, controller 124 may be configured to cause, trigger, and/or control device 102 to perform the functionality of the initiator station.

In some demonstrative embodiments, controller 154 may be configured to cause, trigger, and/or control device 140 to perform the functionality of the responder station.

In some demonstrative embodiments, devices 102 and 140 may be configured to perform the TXSS protocol of the SLS protocol, for example, according to the first implementation option, e.g., as described below.

In some demonstrative embodiments, devices 102 and 140 may be configured to perform the ISS phase of the TXSS protocol ("the TXSS ISS phase"), for example, according to the first implementation option, e.g., as described below.

In some demonstrative embodiments, controller 124 may be configured to cause, trigger, and/or control device 102 to perform a sequence of a plurality of TXSS via the plurality of antennas 107, respectively, for example, during the TXSS ISS phase.

In some demonstrative embodiments, controller 124 may be configured to cause, trigger, and/or control device 102 to repeat the sequence of the plurality of TXSS, for example, based on a number of antennas 147.

In some demonstrative embodiments, a TXSS via the antenna 107 of the plurality of antennas 107 may include transmitting a plurality of initiator Sector Sweep (SSW) frames via respective sectors of sectors 135 of the antenna 107.

In some demonstrative embodiments, device 140 may receive the plurality of initiator SSW frames from device 102.

In some demonstrative embodiments, controller 154 may be configured to cause, trigger, and/or control device 140 to operate the plurality of antennas 147 at an Omni-receive mode, for example, to receive the plurality of initiator SSW frames from device 102.

In some demonstrative embodiments, controller 154 may be configured to cause, trigger, and/or control device 140 to sequentially operate the plurality of antennas 147 at the Omni-receive mode during the TXSS ISS phase.

In some demonstrative embodiments, controller 154 may be configured to cause, trigger, and/or control device 140 to determine a plurality of initiator transmit sectors of antennas 107 of device 102, for example, based on the initiator SSW frames.

In some demonstrative embodiments, the plurality of initiator transmit sectors of antennas 107 may correspond to a respective plurality of different combinations of one of the plurality of antennas of antennas 147 and one of a plurality of antennas 107 of device 102, e.g., as described below.

In some demonstrative embodiments, controller 154 may be configured to cause, trigger, and/or control device 140 to transmit to device 102 a plurality of responder SSW frames including an indication of the plurality of initiator transmit sectors, for example, during the RSS phase, e.g., of the TXSS protocol according to the first implementation, e.g., as described below.

In some demonstrative embodiments, devices 102 and 140 may be configured to perform the RSS phase of the TXSS protocol ("the TXSS RSS phase"), for example, according to the first implementation option, e.g., as described below.

In some demonstrative embodiments, controller 154 may be configured to cause, trigger, and/or control device 140 to perform a sequence of a plurality of TXSS via the plurality of antennas 147 of device 140, respectively.

In some demonstrative embodiments, controller 154 may be configured to cause, trigger, and/or control device 140 to repeat the sequence of TXSS, for example, based on a number of antennas 107 of device 102.

In some demonstrative embodiments, a TXSS via the antenna 147 of the plurality of antennas 147 device 140 may include transmitting a plurality of responder SSW frames via respective sectors of sectors 145 of the antenna 147.

In some demonstrative embodiments, a responder SSW frame transmitted from an antenna 147 of device 140 to an antenna 107 of device 102 may include an indication of an initiator transmit sector of the antenna 107 to transmit to the antenna 147 of device 140.

In some demonstrative embodiments, device 102 may receive the plurality of responder SSW frames from device 140, for example, during the TXSS RSS phase.

In some demonstrative embodiments, controller 124 may be configured to cause, trigger, and/or control device 102 to operate the plurality of antennas 107 of device 102 to operate at an Omni-receive mode to receive the plurality of responder SSW frames from device 140.

In some demonstrative embodiments, controller 124 may be configured to cause, trigger, and/or control device 102 to sequentially operate the plurality of antennas of the first wireless station at the Omni-receive mode, for example, during the TXSS RSS phase.

In some demonstrative embodiments, controller 124 may be configured to cause, trigger, and/or control device 102 to determine a plurality of responder transmit sectors of antennas 147 of device 140, for example, based on the responder SSW frames.

In some demonstrative embodiments, the plurality of responder transmit sectors determined by device 102 may correspond to a respective plurality of different combinations of one of the plurality of antennas 107, and one of the plurality of antennas 147, e.g., as described below.

In some demonstrative embodiments, controller 124 may be configured to cause, trigger, and/or control device 102 to transmit to device 140 a feedback frame including an indication of the plurality of responder transmit sectors, for example, subsequent to the TXSS RSS phase.

In some demonstrative embodiments, both devices 102 and 140 may have knowledge of the best TX sectors, for example, after completion of the TXSS protocol, e.g., according to the first implementation option.

Figure 4:
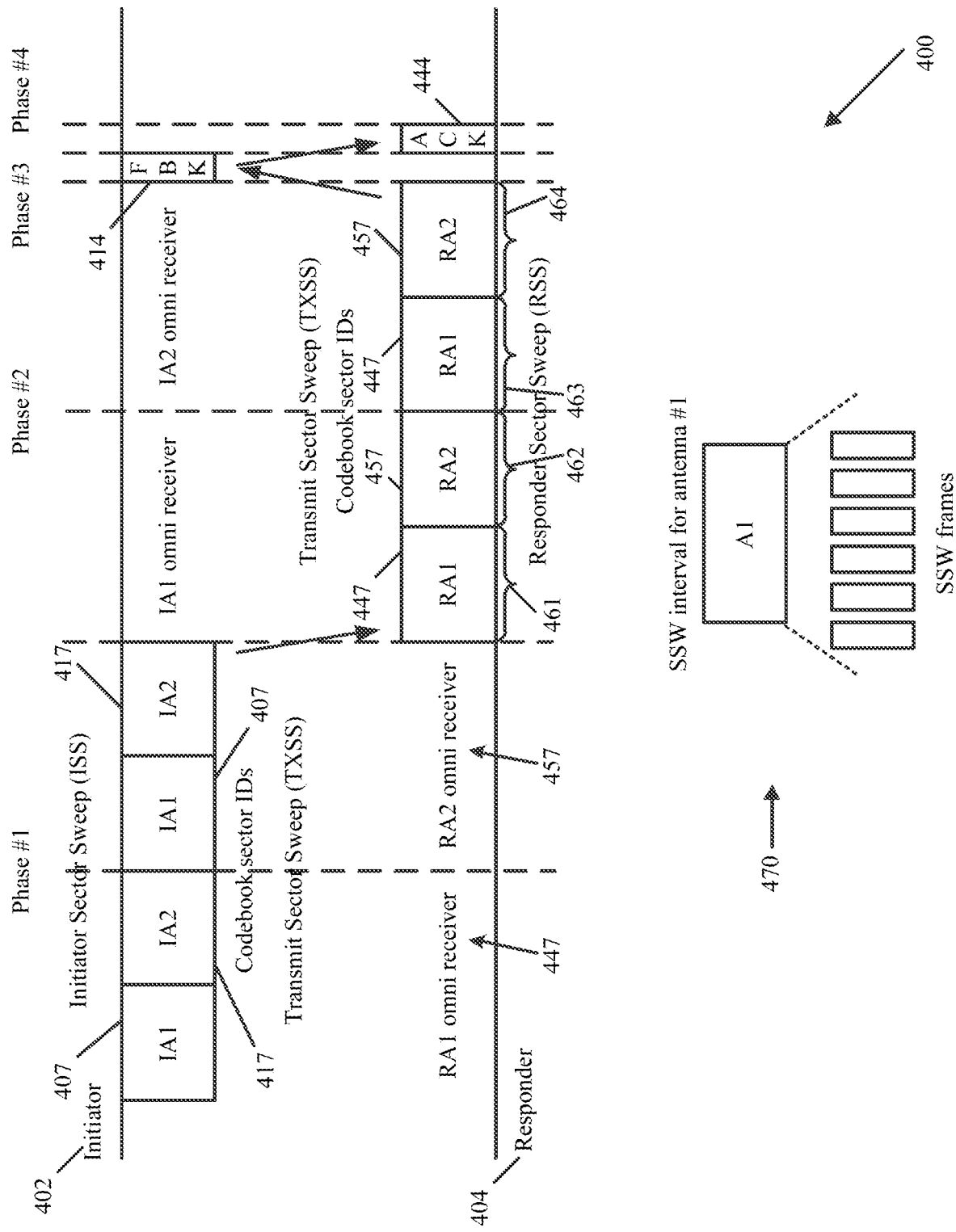
FIG. 4 is a schematic illustration of a SLS TXSS protocol, in accordance with some demonstrative embodiments.

Reference is made to FIG. 4, which schematically illustrates an SLS TXSS protocol 400 between an initiator 402 and a responder 440, in accordance with some demonstrative embodiments. For example, device 102 (FIG. 1) may operate as initiator 402, and/or device 140 (FIG. 1) may operate as responder 440.

In some demonstrative embodiments, SLS TXSS protocol 400 may be performed for SU-MIMO training.

In some demonstrative embodiments, SLS TXSS protocol 400 may be performed according to the first implementation option.

In some demonstrative embodiments, SLS TXSS protocol 400 may be configured for an example of a 2×2 MIMO scheme, assuming that both initiator 402 and responder 440 have two antennas.

In other embodiments, SLS TXSS protocol 400 may be configured for any other MIMO scheme, e.g., any other N×M scheme may be used. For example, SLS TXSS protocol 400 may not depend on the number of antennas, and/or may be scalable to any arbitrary parameters, e.g., of any suitable MIMO scheme.

In some demonstrative embodiments, one or more operations of SLS TXSS protocol 400 may be at least partially compatible with a legacy SLS protocol, for example, in accordance with an IEEE 802.11ad Specification, e.g., except at least for a feedback to be sent on the best TX sector IDs, e.g., as described below.

In some demonstrative embodiments, SLS TXSS protocol 400 may include, for example, 4 phases, denoted Phase #1, Phase #2, Phase #3, and Phase #4, e.g., as described below.

In some demonstrative embodiments, as shown in FIG. 4, the first phase may include the TXSS ISS phase, during which initiator 402 may perform a TXSS over sectors of a first antenna 407, denoted IA1, and over sectors of a second antenna 417, denoted IA2, for example, by transmitting initiator SSW frames, e.g., SSW frames 470.

In some demonstrative embodiments, as shown in FIG. 4, the initiator 402 may repeat the TXSS, for example, two times, e.g., in order to train a first antenna 447, denoted RA1, and a second antenna 457, denoted RA2, of responder 440.

In some demonstrative embodiments, as shown in FIG. 4, the responder 440 may receive the initiator SSW frames, e.g., using an Omni antenna pattern for antenna 447 and antenna 457 sequentially, for example, first for antenna 447 and then for antenna 457.

In some demonstrative embodiments, as shown in FIG. 4, the second phase may include the TXSS RSS phase, during which responder 440 may perform a TXSS over sectors of the first antenna 447 and over sectors of the second antenna 457, for example, by transmitting responder SSW frames, e.g., SSW frames 470.

In some demonstrative embodiments, the TXSS RSS phase of the TXSS protocol 400 may be similar to the TXSS ISS phase of the TXSS protocol 400, e.g., in an opposite direction.

In some demonstrative embodiments, as shown in FIG. 4, the responder 440 may repeat the TXSS, for example, two times, e.g., in order to train the first antenna 407 and the second antenna 417 of responder 440.

In some demonstrative embodiments, initiator 402 may receive the responder SSW frames, for example, using an Omni antenna pattern for antennas 407 and 417 sequentially, for example, first for antenna 407 and then for antenna 417.

In some demonstrative embodiments, as shown in FIG. 4, antennas 407 and 417 may not be operated concurrently during the TXSS RSS phase.

In some demonstrative embodiments, responder 440 may feedback to initiator 402 an indication of the best TX sector IDs, e.g., as described below.

In some demonstrative embodiments, responder 440 may send the responder SSW frames including an indication of the best initiator Tx sector IDs for antenna combinations.

For example, as shown in FIG. 4, during an interval 461, the responder 440 may send to initiator 402 the best TX sector between antenna 407 and antenna 447; during an interval 462 the responder 440 may send to initiator 402 the best TX sector between antenna 407 and antenna 457; during an interval 463 the responder 440 may send to initiator 402 the best TX sector between antenna 417 and antenna 447; and/or during an interval 464 the responder 440 may send to initiator 402 the best TX sector between antenna 417 and antenna 457.

In one example, the best initiator TX sector IDs of initiator 402 may be denoted as I_H11 (IA1→RA1), I_H21 (IA2→RA1), I_H12 (IA1→RA2), and I_H22 (IA2→RA2).

As shown in FIG. 4, the third phase may include transmission of an SSW-Feedback frame 414 from the initiator 402 to the responder 440.

In one example, the SSW-Feedback frame 414 may include information of the best Tx sector IDs of responder 240, which were found during the TXSS RSS phase of the TXSS protocol 400.

In one example, the best responder TX sector IDs of responder 440 may be denoted as R_H11 (RA1→IA1), R_H21 (RA2→IA1), R_H12 (RA1→IA2), and R_H22 (RA2→IA2).

In some demonstrative embodiments, as shown in FIG. 4, the fourth phase may include transmission of an SSW Acknowledgement (Ack) frame 444 from the responder 440 to initiator 402.

In some demonstrative embodiments, the output of TXSS protocol 400 may be, for example, four best TX sectors, e.g., for both initiator 402 and receiver 440.

In some demonstrative embodiments, a total duration of SLS TXSS protocol 400 may be, for example, proportional to the total number of TX sectors multiplied by the number of RX antennas.

Figure 5:
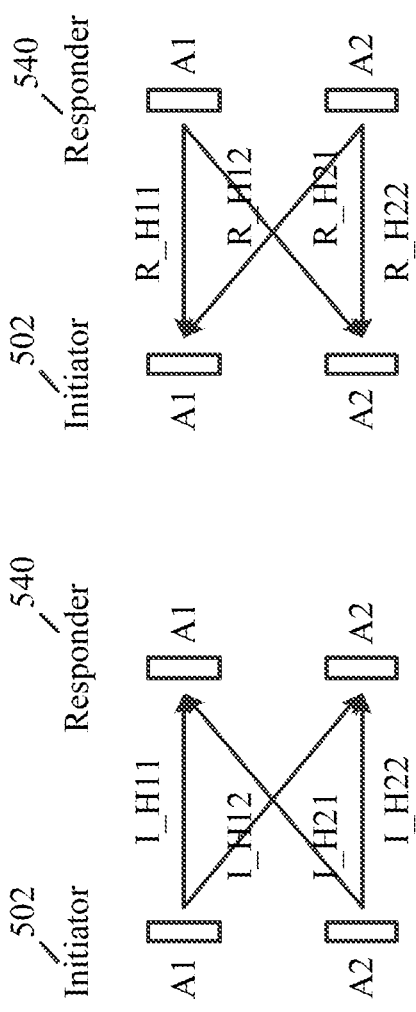
FIG. 5 is a schematic illustration of selected TXSS sectors, in accordance with some demonstrative embodiments.

Reference is made to FIG. 5, which schematically illustrates selected TXSS sectors for an initiator 502 and a responder 540, in accordance with some demonstrative embodiments. For example, initiator 502 may perform the functionality of initiator 402 (FIG. 4), and/or responder 440 may perform the functionality of responder 440 (FIG. 4).

In some demonstrative embodiments, the selected TXSS sectors for the initiator 502 and the responder 540 may be selected, for example, during SLS TXSS protocol 400 (FIG. 4), e.g., after the beamforming search.

In some demonstrative embodiments, as shown in FIG. 5, the selected TXSS sectors for the initiator 502 may include the initiator TX sector having the IDs denoted as I_H11 (IA1→RA1), I_H21 (IA2→RA1), I_H12 (IA1→RA2), and I_H22 (IA2→RA2).

In some demonstrative embodiments, as shown in FIG. 5, the selected TXSS sectors for the responder 540 may include the responder TX sector having the IDs denoted as R_H11 (RA1→IA1), R_H21 (RA2→IA1), R_H12 (RA1→IA2), and R_H22 (RA2→IA2).

In some demonstrative embodiments, some legacy protocols, for example, a according to a current IEEE 802.11ad Standard, may not allow to transmit information on the plurality of the responder TX sector IDs, e.g., the R_Hij sectors, for example, the four best sectors for a 2×2 MIMO scheme, for example, using a Control frame.

In some demonstrative embodiments, a field ("control trailer field") may be appended to an SSW frame, e.g., SSW-Feedback frame 414 (FIG. 4), for example, to carry the information on the best responder TX sector IDs. In other embodiments, the information on responder TX sector IDs may be signaled according to any other mechanism.

Referring back to FIG. 1, in some demonstrative embodiments, devices 102 and 140 may be configured to perform the RXSS protocol of the SLS protocol, for example, according to the first implementation option, e.g., as described below.

In some demonstrative embodiments, devices 102 and 140 may be configured to perform the ISS phase of the RXSS protocol ("the RXSS ISS phase"), for example, according to the first implementation option, e.g., as described below.

In some demonstrative embodiments, controller 124 may be configured to cause, trigger, and/or control device 102 to sequentially transmit a plurality of initiator SSW transmission sequences via respective antennas of the plurality of antennas 107, e.g., during the RXSS ISS phase.

In some demonstrative embodiments, an initiator SSW transmission sequence via an antenna 107 may include transmitting a plurality of initiator SSW frames via a first selected initiator transmit sector of the antenna 107.

In some demonstrative embodiments, the first selected initiator transmit sector may be based on the TXSS protocol. For example, the first selected initiator transmit sector may include the TX sector I_H11.

In some demonstrative embodiments, controller 124 may be configured to cause, trigger, and/or control device 102 to repeat transmission of the initiator SSW frames via at least a second selected initiator transmit sector of the antenna 107, for example, based on a number of antennas 147 of device 140.

For example, device 102 may repeat the transmission of the initiator SSW frames to device 140 for two times, e.g., if antennas 147 include two antennas.

In some demonstrative embodiments, the second selected initiator transmit sector may be based on the TXSS protocol. For example, the second selected initiator transmit sector may include the TX sector I_H12.

In some demonstrative embodiments, device 140 may receive the plurality of initiator SSW transmission sequences from device 102.

In some demonstrative embodiments, controller 154 may be configured to cause, trigger, and/or control device 140 to sequentially perform a plurality of RXSS via respective antennas of the plurality of antennas 147 of device 140, e.g., during the RXSS ISS phase of the RXSS protocol.

In some demonstrative embodiments, controller 154 may be configured to cause, trigger, and/or control device 140 to repeat the plurality of RXSS, for example, based on a number of antennas 107 of device 102.

For example, device 140 may repeat the plurality of RXSS for two times, e.g., if antennas 107 include two antennas.

In some demonstrative embodiments, controller 154 may determine a plurality of responder RX sectors of antennas 147, for example, based on the plurality of initiator SSW transmission sequences from device 102.

In some demonstrative embodiments, devices 102 and 140 may be configured to perform the RSS phase of the RXSS protocol ("the RXSS RSS phase"), for example, according to the first implementation option, e.g., as described below.

In some demonstrative embodiments, controller 154 may be configured to cause, trigger, and/or control device 140 to sequentially transmit a plurality of responder SSW transmission sequences via respective antennas of the plurality of antennas 147 of device 140, e.g., during the RXSS RSS phase of the RXSS protocol.

In some demonstrative embodiments, a responder SSW transmission sequence via an antenna 147 of device 140 may include transmitting a plurality of responder SSW frames via a first selected responder transmit sector of the antenna 147.

In some demonstrative embodiments, the first selected responder transmit sector may be based on the TXSS protocol. For example, the first selected responder transmit sector of the antenna 147 may include the TX sector R_H11.

In some demonstrative embodiments, controller 154 may be configured to cause, trigger, and/or control device 140 to repeat transmission of the responder SSW frames via at least a second selected responder transmit sector of the antenna 147, for example, based on a number of antennas 107 of device 102.

For example, device 140 may repeat the transmission of the responder SSW frames to device 102 for two times, e.g., if antennas 107 include two antennas.

In some demonstrative embodiments, the second selected responder transmit sector may be based on the TXSS protocol. For example, the second selected responder transmit sector of the antenna 147 may include the TX sector R_H12.

In some demonstrative embodiments, device 102 may receive the plurality of responder SSW transmission sequences from device 140.

In some demonstrative embodiments, controller 124 may be configured to cause, trigger, and/or control device 102 to sequentially perform a plurality of RXSS via respective antennas of the plurality of antennas 107 of device 102, e.g., during the RXSS RSS phase of the RXSS protocol.

In some demonstrative embodiments, controller 124 may be configured to cause, trigger, and/or control device 102 to repeat the plurality of RXSS, for example, based on a number of antennas 147 of device 140.

For example, device 102 may repeat the plurality of RXSS for two times, e.g., if antennas 147 include two antennas.

In some demonstrative embodiments, controller 124 may determine a plurality of initiator RX sectors of antennas 107, for example, based on the plurality of responder SSW transmission sequences from device 140.

In some demonstrative embodiments, both devices 102 and 140 may have knowledge of the best RX sectors, for example, after completion of the RXSS protocol, e.g., according to the first implementation option.

Figure 6:
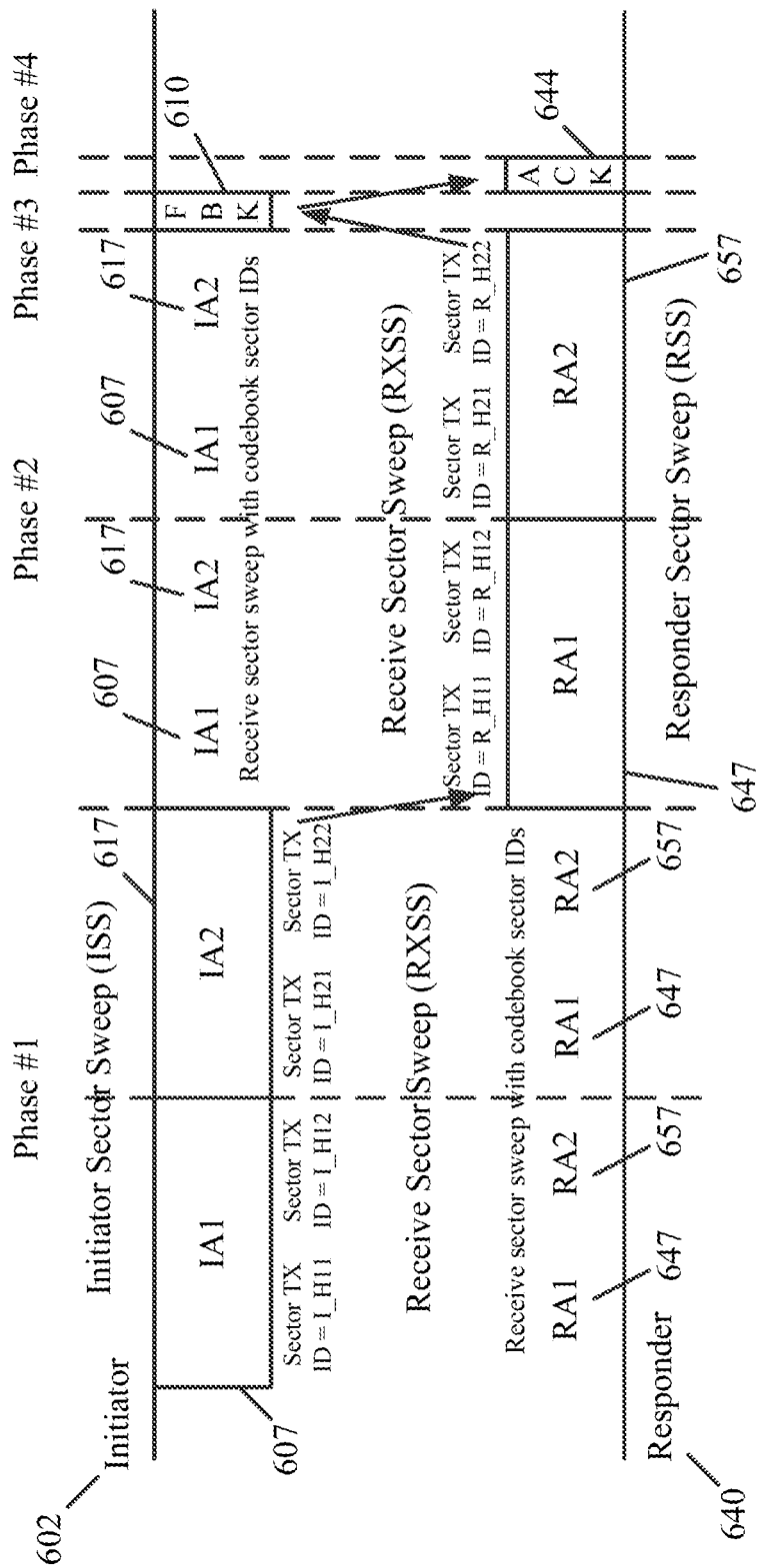
FIG. 6 is a schematic illustration of a SLS RXSS protocol, in accordance with some demonstrative embodiments.

Reference is made to FIG. 6, which schematically illustrates an SLS RXSS protocol 600 between an initiator 602 and a responder 640, in accordance with some demonstrative embodiments. For example, device 102 (FIG. 1) may operate as initiator 602, and/or device 140 (FIG. 1) may operate as responder 640.

In some demonstrative embodiments, SLS RXSS protocol 600 may be performed for SU-MIMO training.

In some demonstrative embodiments, SLS RXSS protocol 600 may be according to the first implementation option.

In some demonstrative embodiments, SLS RXSS protocol 600 may be configured for an example of a 2×2 MIMO scheme, assuming that both initiator 602 and responder 640 have two antennas.

In other embodiments, SLS RXSS protocol 600 may be configured for any other MIMO scheme, e.g., any other N×M scheme may be used. For example, SLS RXSS protocol 600 may not depend on the number of antennas, and/or may be scalable to any arbitrary parameters, e.g., of any suitable MIMO scheme.

In some demonstrative embodiments, SLS RXSS protocol 600 may include one or more features and/or operations, which may be new and/or may not be supported by a legacy protocol, e.g., in accordance with a legacy IEEE 802.11ad Standard.

In some demonstrative embodiments, SLS RXSS protocol 600 may be configured to allow finding the best RX sectors for an SU-MIMO configuration.

In some demonstrative embodiments, SLS RXSS protocol 600 protocol may include, for example, 4 phases, denoted Phase #1, Phase #2, Phase #3, and Phase #4, e.g., as described below.

In some demonstrative embodiments, as shown in FIG. 6, the first phase of SLS RXSS protocol 600 may include the RXSS ISS phase, during which responder 640 may perform an RXSS over sectors of a first antenna 647, denoted RA1, and over sectors of a second antenna 657, denoted RA2, for example, by transmitting initiator SSW frames.

In some demonstrative embodiments, as shown in FIG. 6, responder 640 may repeat the RXSS over the sectors of the first antenna 647 and over the sectors of the second antenna 657 for two times, for example, to train for two antennas of initiator 602.

In some demonstrative embodiments, as shown in FIG. 6, the first phase may include transmitting from initiator 602 to responder 640 initiator SSW frames via two selected sectors of a first antenna 607, denoted IA1, and two selected sectors of a second antenna 617, denoted IA2.

In some demonstrative embodiments, as shown in FIG. 6, the initiator 602 may transmit the initiator SSW frames sequentially with the best TX sector of initiator 602 selected during the TXSS protocol, e.g., TXSS protocol 400 (FIG. 4). For example, the initiator 602 may sequentially transmit the initiator SSW frames via the best initiator TX sectors having the IDs I_H11 (IA1→RA1), I_H21 (IA2→RA1), I_H12 (IA1→RA2), and/or I_H22 (IA2→RA2), e.g., as described above.

In some demonstrative embodiments, as shown in FIG. 6, the initiator 602 may switch between the best TX sectors of an antenna, e.g., antenna 607 or 617, for example, when the responder 640 switches between antennas 647 and 657. For example, the initiator 602 may be aware of antenna capabilities of responder 640.

In some demonstrative embodiments, as shown in FIG. 6, the initiator 602 may switch between antennas 607 and 617, for example, when the responder 640 switches from antenna 657 to 647. For example, the initiator 602 may be aware of antenna capabilities of responder 640.

In some demonstrative embodiments, as shown in FIG. 6, the second phase may include the RXSS RSS phase, during which initiator 602 may perform the RXSS over sectors of the first antenna 607 and over sectors of the second antenna 617.

In some demonstrative embodiments, as shown in FIG. 6, initiator 602 may repeat the RXSS over the sectors of the first antenna 607 and over the sectors of the second antenna 617 for two times, for example, to train for two antennas of responder 640.

In some demonstrative embodiments, the RXSS RSS phase of SLS RXSS protocol 600 may be similar to the RXSS ISS phase of SLS RXSS protocol 600, e.g., in an opposite direction.

In some demonstrative embodiments, as shown in FIG. 6, the second phase may include transmitting from responder 640 to initiator 602 responder SSW frames via two selected sectors of the first antenna 647 and two selected sectors of the second antenna 657.

In some demonstrative embodiments, as shown in FIG. 6, the responder 640 may transmit the responder SSW frames sequentially with the best TX sector of responder 640 selected during the TXSS protocol, e.g., TXSS protocol 400 (FIG. 4). For example, the responder 640 may sequentially transmit the responder SSW frames via the best responder TX sectors having the IDs R_H11 (RA1→IA1), R_H21 (RA2→IA1), R_H12 (RA1→IA2), and/or R_H22 (RA2→IA2), e.g., as described above.

In some demonstrative embodiments, as shown in FIG. 6, the responder 640 may switch between the best TX sectors of an antenna, e.g., antenna 647 or 657, for example, when the initiator 602 switches between antennas 607 and 617. For example, the responder may be aware of antenna capabilities of initiator 602.

In some demonstrative embodiments, as shown in FIG. 6, the responder 640 may switch from antenna 647 to antenna 657, for example, when the initiator 602 switches from antenna 617 to antenna 607. For example, the responder 640 may be aware of antenna capabilities of initiator 602.

In some demonstrative embodiments, as shown in FIG. 6, the third phase of SLS RXSS protocol 600 may include transmission of an SSW-Feedback frame 614 from the initiator 602 to the responder 640.

In some demonstrative embodiments, as shown in FIG. 6, the fourth phase of SLS RXSS protocol 600 may include transmission of an SSW Ack frame 644 from the responder 440 to initiator 602, for example, to acknowledge receipt of SSW-Feedback frame 614.

In some demonstrative embodiments, SLS RXSS protocol 600 may be different, for example, from a legacy RXSS protocol, e.g., a legacy 802.11ad RXSS protocol, which may perform training for the best TX sector (best antenna) only, e.g., by making an antenna selection. The legacy RXSS protocol may not allow training all TX best sectors, e.g., of antennas 607, 617, 647 and/or 657, which may be required for SU-MIMO.

In some demonstrative embodiments, the output of RXSS protocol 600 may be, for example, four best RX sectors, e.g., for both initiator 602 and receiver 640.

In some demonstrative embodiments, the output of TXSS protocol 400 (FIG. 4) and the RXSS protocol 600 may be, for example, four TX sectors and four RX sectors, e.g., for both initiator 602 and receiver 640.

Figure 7:
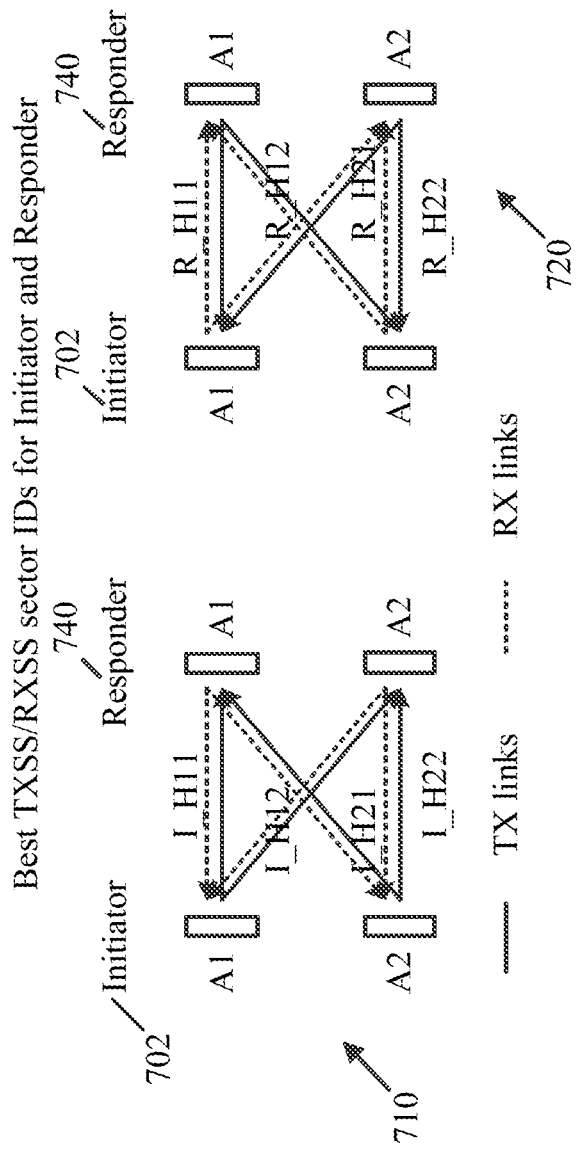
FIG. 7 is a schematic illustration of combinations of selected TX and RX sectors, in accordance with some demonstrative embodiments.

Reference is made to FIG. 7, which schematically illustrates combinations of selected TX sectors 710 and selected RX sectors 720 for an initiator 702 and a responder 740, in accordance with some demonstrative embodiments. For example, initiator 502 may perform the functionality of initiator 402 (FIG. 4) and/or initiator 602 (FIG. 6), and/or responder 440 may perform the functionality of responder 440 (FIG. 4) and/or responder 640 (FIG. 6).

In some demonstrative embodiments, selected TX sectors 710 may be determined according to the output of TXSS protocol 400 (FIG. 4).

In some demonstrative embodiments, selected RX sectors 720 may be determined according to the output of RXSS protocol 600 (FIG. 6).

In some demonstrative embodiments, initiator 702 and responder 740 may be configured to select communication links for data transmission/reception, for example, based on selected TX sectors 710 and/or selected RX sectors 720.

In some demonstrative embodiments, initiator 702 and responder 740 may be configured to select the communication links for the data transmission/reception, for example, based on the quality of selected TX sectors 710 and/or selected RX sectors 720.

In some demonstrative embodiments, initiator 702 and responder 740 may be configured to select the communication links for the data transmission/reception, for example, based on the communication scheme between initiator 702 and responder 740, e.g., a SISO communication scheme, a MIMO communication scheme, e.g., 2×2 MIMO communication scheme, a SIMO communication scheme, e.g., a Maximum Ratio Combining (MRC) scheme, and/or a MISO communication scheme, e.g., an Alamouti scheme.

Figure 8:
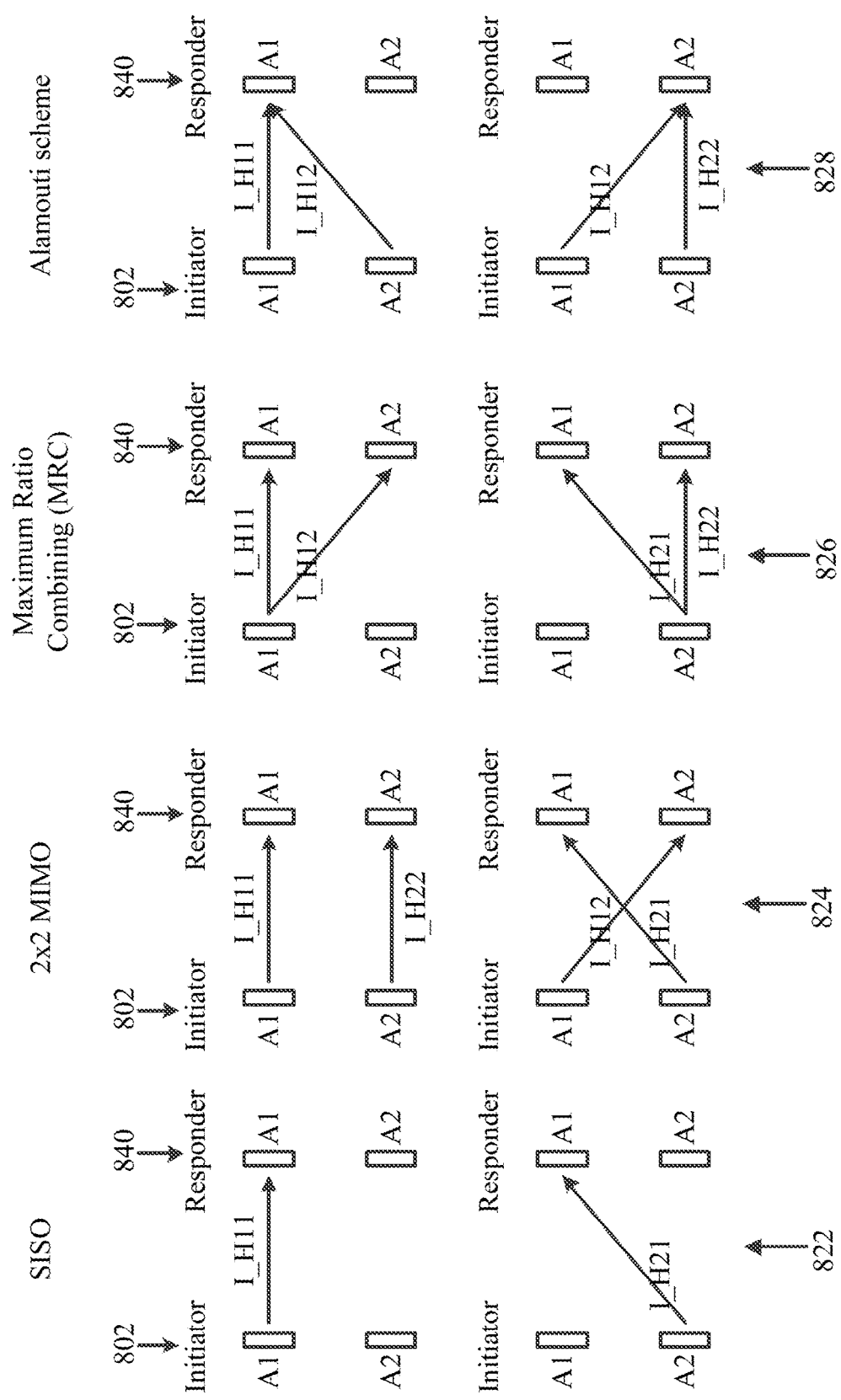
FIG. 8 is a schematic illustration of a plurality of initiator TX links, in accordance with some demonstrative embodiments.

Reference is made to FIG. 8, which schematically illustrates a plurality of initiator TX links 800 between an initiator 802 and a responder 840, in accordance with some demonstrative embodiments. For example, initiator 802 may perform the functionality of initiator 402 (FIG. 4), initiator 702 (FIG. 7) and/or initiator 602 (FIG. 6); and/or responder 840 may perform the functionality of responder 440 (FIG. 4), responder 740 (FIG. 7), and/or responder 640 (FIG. 6).

In some demonstrative embodiments, as shown in FIG. 8, the initiator 802 may be configured to select various different types of TX links.

In one example, the initiator 802 may be configured to select the different TX links, for example, to support at least four communication schemes, e.g., link to support a SISO communication scheme 822, link to support a 2×2 MIMO communication scheme 824, links to support a SIMO communication scheme 826, e.g., an MRC scheme, and/or links to support a MISO communication scheme 828, e.g., an Alamouti scheme.

In some demonstrative embodiments, e.g., in a general case, the different links selected for transmission and reception may be symmetric or asymmetric.

Referring back to FIG. 1, in some demonstrative embodiments, devices 102 and 140 may be configured to perform the SLS protocol, for example, according to the second implementation option, e.g., as described below.

In some demonstrative embodiments, devices 102 and 140 may be configured to perform the TXSS protocol of the SLS protocol, for example, according to the second implementation option, e.g., as described below.

In some demonstrative embodiments, during the TXSS protocol, e.g., according to the second implementation option, antennas of a receiver, e.g., one of devices 102 and 140, may be allowed to simultaneously receive SSW frames from a transmitter, e.g., another one of devices 102 and 140, e.g., as describe below.

In some demonstrative embodiments, devices 102 and 140 may be configured to perform the TXSS ISS phase of the TXSS protocol, for example, according to the second implementation option, e.g., as described below.

In some demonstrative embodiments, during the TXSS ISS phase, e.g., according to the second implementation option, device 140 may be configured to simultaneously operate the plurality of antennas 147 of device 140 at the Omni-receive mode.

In some demonstrative embodiments, controller 144 may be configured to cause, trigger, and/or control device 140 to simultaneously operate the plurality of antennas 147 at the Omni-receive mode, e.g., during the TXSS ISS phase according to the second implementation option.

In some demonstrative embodiments, devices 102 and 140 may be configured to perform the TXSS RSS phase of the TXSS protocol, for example, according to the second implementation option, e.g., as described below.

In some demonstrative embodiments, during the TXSS RSS phase, e.g., according to the second implementation option, device 102 may be configured to simultaneously operate the plurality of antennas 107 of device 102 at the Omni-receive mode.

In some demonstrative embodiments, controller 124 may be configured to cause, trigger, and/or control device 102 to simultaneously operate the plurality of antennas 107 at the Omni-receive mode, e.g., during the TXSS RSS phase according to the second implementation option.

Reference is made to FIG. 9, which schematically illustrates an SLS TXSS protocol 900 between an initiator 902 and a responder 940, in accordance with some demonstrative embodiments. For example, device 102 (FIG. 1) may operate as initiator 902, and/or device 140 (FIG. 1) may operate as responder 940.

In some demonstrative embodiments, SLS TXSS protocol 900 may be performed for SU-MIMO training.

In some demonstrative embodiments, SLS TXSS protocol 900 may be performed according to the second implementation option.

In some demonstrative embodiments, SLS TXSS protocol 900 may be configured for an example of a 2×2 MIMO scheme, assuming that both initiator 902 and responder 940 have two antennas.

In other embodiments, SLS TXSS protocol 900 may be configured for any other MIMO scheme, e.g., any other N×M scheme may be used. For example, SLS TXSS protocol 900 may not depend on the number of antennas, and/or may be scalable to any arbitrary parameters, e.g., of any suitable MIMO scheme.

In some demonstrative embodiments, SLS TXSS protocol 900 may include, for example, 4 phases, denoted Phase #1, Phase #2, Phase #3, and Phase #4, e.g., as described below.

In some demonstrative embodiments, as shown in FIG. 9, the first phase may include the TXSS ISS phase, during which initiator 902 may perform a TXSS over sectors of a first antenna 907, denoted IA1, and over sectors of a second antenna 917, denoted IA2, for example, by transmitting initiator SSW frames, e.g., SSW frames 970.

In some demonstrative embodiments, as shown in FIG. 9, the responder 940 may receive the initiator SSW frames, e.g., simultaneously using an Omni antenna pattern for antenna 947 and antenna 957.

In some demonstrative embodiments, as shown in FIG. 9, the initiator 902 may not have to repeat the TXSS, e.g., in order to train both antennas 947 and 957 of responder 940.

In some demonstrative embodiments, as shown in FIG. 9, the second phase may include the TXSS RSS phase, during which responder 940 may perform a TXSS over sectors of the first antenna 947 and over the sectors of the second antenna 957, for example, by transmitting responder SSW frames, e.g., SSW frames 970.

In some demonstrative embodiments, as shown in FIG. 9, the initiator 902 may receive the responder SSW frames, e.g., simultaneously using an Omni antenna pattern for antenna 907 and antenna 917.

In some demonstrative embodiments, as shown in FIG. 9, the responder 940 may not have to repeat the TXSS, e.g., in order to train both antennas 907 and 917 of initiator 902.

In some demonstrative embodiments, simultaneously operating antennas 907 and 917, and/or simultaneously operating antennas 947 and 957 at the omni-receive mode may not be supported by a legacy SLS protocol, e.g., which assumes only one Radio Frequency (RF) part or component per device.

In some demonstrative embodiments, simultaneously operating antennas 907 and 917, and/or simultaneously operating antennas 947 and 957 at the Omni-receive mode may reduce a duration of TXSS protocol 900, e.g., as described below.

In some demonstrative embodiments, the duration of TXSS protocol 900 may be propositional to the total number of transmit sectors, e.g., while being independent of the number of RX antennas.

In some demonstrative embodiments, the TXSS protocol of FIG. 9 may be configured, for example, to provide at least an advantage of a total duration of the TXSS protocol being proportional to the total number of transmit sectors, e.g., while being independent of the number of RX antennas.

In some demonstrative embodiments, the responder SSW frames of responder 940 may include an indication of the best initiator Tx sector IDs for a plurality of antenna combinations.

In one example, during the TXSS RSS, each frame of the responder SSW frames may include the best initiator TX sector having the IDs I_H11 (IA1→RA1), I_H21 (IA2→RA1), I_H12 (IA1→RA2), and/or I_H22 (IA2→RA2).

As shown in FIG. 9, the third phase may include transmission of an SSW-Feedback frame 914 from the initiator 902 to the responder 940

In some demonstrative embodiments, as shown in FIG. 9, the SSW-Feedback frame 914 may include an indication of the best responder Tx sector IDs for a plurality of antenna combinations.

In one example, the SSW-Feedback frame 914 may include the best responder TX sector having the IDs R_H11 (RA1→IA1), R_H21 (RA2→IA1), R_H12 (RA1→IA2), and/or R_H22 (RA2→IA2).

Referring back to FIG. 1, in some demonstrative embodiments, devices 102 and 140 may be configured to perform the RXSS protocol of the SLS protocol, for example, according to the second implementation option, e.g., as described below.

In some demonstrative embodiments, for example, during the RXSS protocol, e.g., according to the second implementation option, the devices 102 and 140 may not be able to simultaneously transmit from a single antenna and two different sectors. Accordingly, link selection may be performed, for example, after the TXSS protocol of the SLS protocol.

In some demonstrative embodiments, devices 102 and 140 may be configured to perform the RXSS ISS phase of the RXSS protocol, for example, according to the second implementation option, e.g., as described below.

In some demonstrative embodiments, during the RXSS ISS phase of the RXSS protocol, e.g., according to the second implementation option, device 102 may be configured to select between a first selected TX sector and a second selected Tx sector of an antenna 107 of the plurality of antennas 107 to transmit the initiator SSW frames to device 140.

In some demonstrative embodiments, during the RXSS ISS phase of the RXSS protocol, e.g., according to the second implementation option, device 102 may be configured to select between a first antenna and a second antenna of antennas 147 to perform the RXSS, for example, based on the selected initiator Tx sector of device 102.

In some demonstrative embodiments, devices 102 and 140 may be configured to perform the RXSS RSS phase of the RXSS protocol, for example, according to the second implementation option, e.g., as described below.

In some demonstrative embodiments, during the RXSS RSS phase of the RXSS protocol, e.g., according to the second implementation option, device 140 may be configured to select between a first selected TX sector and a second selected Tx sector of an antenna 147 of the plurality of antennas 147 to transmit the initiator SSW frames to device 102.

In some demonstrative embodiments, during the RXSS RSS phase of the RXSS protocol, e.g., according to the second implementation option, device 102 may be configured to select between a first antenna and a second antenna of antennas 107 to perform the RXSS, for example, based on the selected responder TX sector of device 140.

In some demonstrative embodiments, during the RXSS ISS phase, e.g., according to the second implementation option, device 102 may be configured to select to operate the plurality of antennas 147 of device 140 at the omni-receive mode.

In some demonstrative embodiments, the RXSS protocol according to the second implementation option may be replaced by the RXSS protocol according to the first implementation option, e.g., RXSS protocol 600 (FIG. 6).

Figure 10:
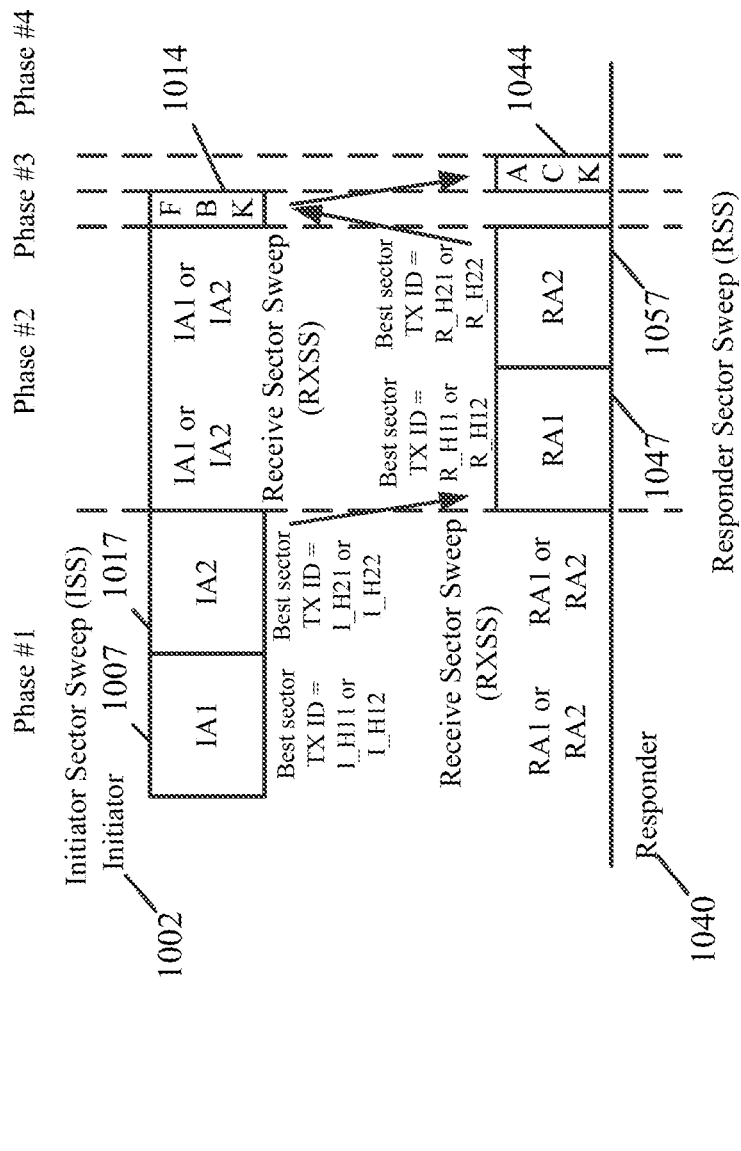
FIG. 10 is a schematic illustration of an SLS RXSS protocol, in accordance with some demonstrative embodiments.

Reference is made to FIG. 10, which schematically illustrates an SLS RXSS protocol 1000 between an initiator 1002 and a responder 1040, in accordance with some demonstrative embodiments. For example, device 102 (FIG. 1) may operate as initiator 1002, and/or device 140 (FIG. 1) may operate as responder 1040.

In some demonstrative embodiments, SLS RXSS protocol 1000 may be performed for SU-MIMO training.

In some demonstrative embodiments, SLS RXSS protocol 1000 may be according to the second implementation option.

In some demonstrative embodiments, SLS RXSS protocol 1000 may be configured for an example of a 2×2 MIMO scheme, assuming that both initiator 1002 and responder 1040 have two antennas.

In other embodiments, SLS RXSS protocol 1000 may be configured for any other MIMO scheme, e.g., any other N×M scheme may be used. For example, SLS RXSS protocol 1000 may not depend on the number of antennas, and/or may be scalable to any arbitrary parameters, e.g., of any suitable MIMO scheme.

In some demonstrative embodiments, SLS RXSS protocol 1000 may include, for example, 4 phases, denoted Phase #1, Phase #2, Phase #3, and Phase #4, e.g., as described below.

In some demonstrative embodiments, as shown in FIG. 10, the first phase may include the RXSS ISS phase, during which the initiator 1002 may select between two selected sectors of an antenna 1007, denoted IA1, e.g., the sectors I-H11 and I_H12, and two selected sectors of an antenna 1017, denoted IA2, e.g., the sectors I-H21 and I_H22, to transmit the initiator SSW frames to the responder 1040.

In some demonstrative embodiments, as shown in FIG. 10, responder 1040 may select between a first antenna 1047, denoted RA1, and a second antenna 1057, denoted RA2, to perform an RXSS, for example, during the transmission of the initiator SSW frames from initiator 1002, e.g., during the RXSS ISS phase of RXSS protocol 1000.

In some demonstrative embodiments, as shown in FIG. 10, the second phase may include the RXSS RSS phase, during which the responder 1040 may select between two selected sectors of the antenna 1047, e.g., the sectors R-H11 and R_H12, and two selected sectors of an antenna 1057, e.g., the sectors R-H21 and R_H22, to transmit the responder SSW frames to the initiator 1002.

In some demonstrative embodiments, as shown in FIG. 10, initiator 1002 may select between the first antenna 1007 and the second antenna 1017 to perform an RXSS, for example, during the transmission of the responder SSW frames from responder 140, e.g., during the RXSS RSS phase of RXSS protocol 1000.

In some demonstrative embodiments, as shown in FIG. 10, the third phase may include transmission of an SSW-Feedback frame 1014 from the initiator 1002 to the responder 1040.

In some demonstrative embodiments, as shown in FIG. 10, the fourth phase may include transmission of an SSW Ack frame 1044 from the responder 1040 to initiator 1002, for example, to acknowledge receipt of SSW-Feedback frame 1014.

In some demonstrative embodiments, performing link selection after the TXSS and RXSS stages may provide more optimal results, e.g., as described above with respect to TXSS protocol 400 (FIG. 4) and RXSS protocol 600 (FIG. 6). However, performing the link selection based on the TXSS, e.g., as described above, may allow, for example, reducing the time duration of RXSS protocol 1000, for example, by a factor of 2, e.g., for a case of two antennas.

Figure 11:
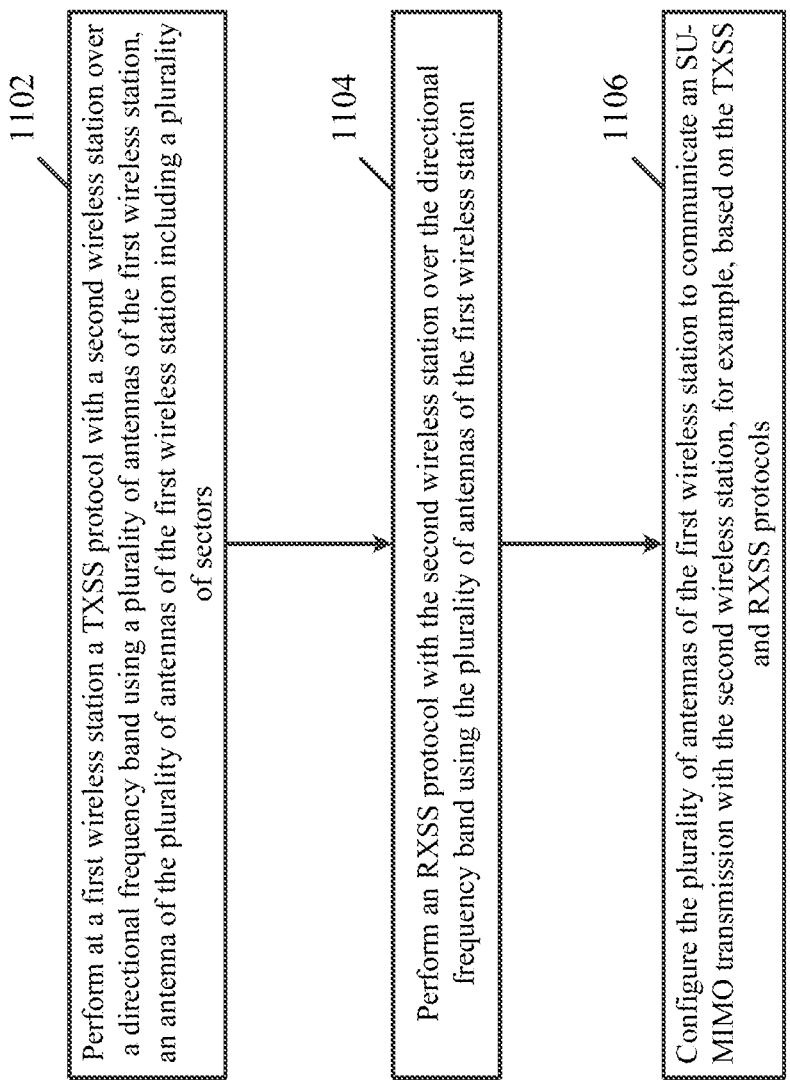
FIG. 11 is a schematic flow-chart illustration of a method of beamforming, in accordance with some demonstrative embodiments.

Reference is made to FIG. 11, which schematically illustrates a method of beamforming, in accordance with some demonstrative embodiments. For example, one or more of the operations of the method of FIG. 11 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1102, the method may include performing at a first wireless station a TXSS protocol with a second wireless station over a directional frequency band using a plurality of antennas of the first wireless station, an antenna of the plurality of antennas of the first wireless station including a plurality of sectors. For example, controller 124 (FIG. 1) may be configured to cause, trigger, and/or control the wireless station implemented by device 102 (FIG. 1) to perform the TXSS protocol with the wireless station implemented by device 140 (FIG. 1) over the directional frequency band using the plurality of antennas 107 (FIG. 1), the antenna 107 including the plurality of sectors 135 (FIG. 1), e.g., as described above.

As indicated at block 1104, the method may include performing an RXSS protocol with the second wireless station over the directional frequency band using the plurality of antennas of the first wireless station. For example, controller 124 (FIG. 1) may be configured to cause, trigger, and/or control device 102 (FIG. 1) to perform the RXSS protocol with device 140 (FIG. 1) over the directional frequency band using the plurality of antennas 107 (FIG. 1), e.g., as described above.

As indicated at block 1106, the method may include configuring the plurality of antennas of the first wireless station to communicate an SU-MIMO transmission with the second wireless station, for example, based on the TXSS and RXSS protocols. For example, controller 124 (FIG. 1) may be configured to cause, trigger, and/or control device 102 (FIG. 1) to communicate the SU-MIMO transmission with device 140 (FIG. 1), for example, based on the TXSS and RXSS protocols, e.g., as described above.

Figure 12:
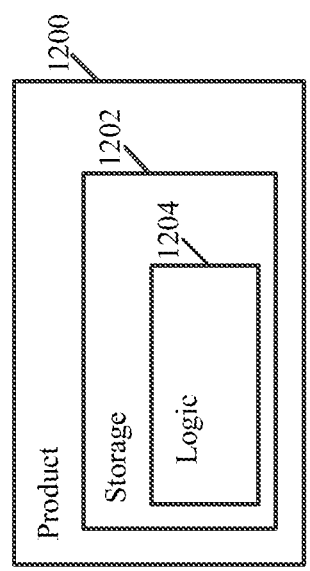
FIG. 12 is a schematic illustration of a product of manufacture, in accordance with some demonstrative embodiments.

Reference is made to FIG. 12, which schematically illustrates a product of manufacture 1200, in accordance with some demonstrative embodiments. Product 1200 may include one or more tangible computer-readable non-transitory storage media 1202, which may include computer-executable instructions, e.g., implemented by logic 1204, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform, trigger and/or implement one or more operations and/or functionalities, for example, one or more operations and/or functionalities described above with reference to FIGS. 1, 2, 3, 4, 5, 6, 7, 8, 9, 10, and/or 11. The phrase "non-transitory machine-readable medium" is directed to include all computer-readable media, with the sole exception being a transitory propagating signal.

In some demonstrative embodiments, product 1200 and/or machine-readable storage medium 1202 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first wireless station to perform a Transmit Sector Sweep (TXSS) protocol with a second wireless station over a directional frequency band using a plurality of antennas of the first wireless station, an antenna of the plurality of antennas of the first wireless station comprising a plurality of sectors; perform a Receive Sector Sweep (RXSS) protocol with the second wireless station over the directional frequency band using the plurality of antennas of the first wireless station; and based on the TXSS and RXSS protocols, configure the plurality of antennas of the first wireless station to communicate a Single-User (SU) Multiple-Input-Multiple-Output (MIMO) transmission with the second wireless station.

Example 2 includes the subject matter of Example 1, and optionally, wherein the TXSS protocol comprises a TXSS initiator sector sweep (ISS) phase of an initiator station, and a TXSS responder sector sweep (RSS) phase of a responder station, and wherein the RXSS protocol comprises an RXSS ISS phase of the initiator station and an RXSS RSS phase of the responder station.

Example 3 includes the subject matter of Example 2, and optionally, wherein the apparatus is configured to cause the first wireless station to operate as the initiator station.

Example 4 includes the subject matter of Example 3, and optionally, wherein the apparatus is configured to cause the first wireless station to, during the TXSS ISS phase, perform a sequence of a plurality of TXSS via the plurality of antennas of the first wireless station, respectively; and to repeat the sequence of the plurality of TXSS based on a number of antennas of the responder station.

Example 5 includes the subject matter of Example 4, and optionally, wherein a TXSS via the antenna of the plurality of antennas of the first wireless station comprises transmitting a plurality of initiator Sector Sweep (SSW) frames via respective sectors of the antenna.

Example 6 includes the subject matter of any one of Examples 3-5, and optionally, wherein the apparatus is configured to cause the first wireless station to, during the TXSS RSS phase, operate the plurality of antennas of the first wireless station at an omni-receive mode to receive a plurality of responder Sector Sweep (SSW) frames from the responder station.

Example 7 includes the subject matter of Example 6, and optionally, wherein a responder SSW frame received at an antenna of the initiator station from an antenna of the responder station comprises an indication of an initiator transmit sector of the antenna of the initiator station to transmit to the antenna of the responder station.

Example 8 includes the subject matter of Example 6 or 7, and optionally, wherein the apparatus is configured to cause the first wireless station to sequentially operate the plurality of antennas of the first wireless station at the omni-receive mode during the TXSS RSS phase.

Example 9 includes the subject matter of Example 6 or 7, and optionally, wherein the apparatus is configured to cause the first wireless station to simultaneously operate the plurality of antennas of the first wireless station at the omni-receive mode during the TXSS RSS phase.

Example 10 includes the subject matter of any one of Examples 6-9, and optionally, wherein the apparatus is configured to cause the first wireless station to determine, based on the responder SSW frames, a plurality of responder transmit sectors of a plurality of antennas of the responder station, and, subsequent to the TXSS RSS phase, to transmit to the responder station a feedback frame comprising an indication of the plurality of responder transmit sectors.

Example 11 includes the subject matter of Example 10, and optionally, wherein the plurality of responder transmit sectors correspond to a respective plurality of different combinations of one of the plurality of antennas of the first wireless station and one of the plurality of antennas of the responder station.

Example 12 includes the subject matter of any one of Examples 3-11, and optionally, wherein the apparatus is configured to cause the first wireless station to, during the RXSS ISS phase, sequentially transmit a plurality of initiator Sector Sweep (SSW) transmission sequences via respective antennas of the plurality of antennas of the first wireless station, an initiator SSW transmission sequence via the antenna of the first wireless station comprises transmitting a plurality of initiator SSW frames via a first selected initiator transmit sector of the antenna, and repeating transmission of the initiator SSW frames via at least a second selected initiator transmit sector of the antenna based on a number of antennas of the responder station.

Example 13 includes the subject matter of Example 12, and optionally, wherein the first and second selected initiator transmit sectors are based on the TXSS protocol.

Example 14 includes the subject matter of any one of Examples 3-13, and optionally, wherein the apparatus is configured to cause the first wireless station to, during the RXSS RSS phase, sequentially perform a plurality of RXSS via respective antennas of the plurality of antennas of the first wireless station, and repeat the plurality of RXSS based on a number of antennas of the responder station.

Example 15 includes the subject matter of Example 2, and optionally, wherein the apparatus is configured to cause the first wireless station to operate as the responder station.

Example 16 includes the subject matter of Example 15, and optionally, wherein the apparatus is configured to cause the first wireless station to, during the TXSS ISS phase, operate the plurality of antennas of the first wireless station at an omni-receive mode to receive a plurality of initiator Sector Sweep (SSW) frames from the initiator station.

Example 17 includes the subject matter of Example 16, and optionally, wherein the apparatus is configured to cause the first wireless station to determine, based on the initiator SSW frames, a plurality of initiator transmit sectors of a plurality of antennas of the initiator station, and, during the TXSS RSS phase, to transmit to the initiator station a plurality of responder SSW frames comprising an indication of the plurality of initiator transmit sectors.

Example 18 includes the subject matter of Example 17, and optionally, wherein the plurality of initiator transmit sectors correspond to a respective plurality of different combinations of one of the plurality of antennas of the first wireless station and one of a plurality of antennas of the initiator station.

Example 19 includes the subject matter of any one of Examples 16-18, and optionally, wherein the apparatus is configured to cause the first wireless station to sequentially operate the plurality of antennas of the first wireless station at the omni-receive mode during the TXSS ISS phase.

Example 20 includes the subject matter of any one of Examples 16-18, and optionally, wherein the apparatus is configured to cause the first wireless station to simultaneously operate the plurality of antennas of the first wireless station at the omni-receive mode during the TXSS ISS phase.

Example 21 includes the subject matter of any one of Examples 15-20, and optionally, wherein the apparatus is configured to cause the first wireless station to, during the TXSS RSS phase, perform a sequence of a plurality of TXSS via the plurality of antennas of the first wireless station, respectively; and to repeat the sequence of TXSS based on a number of antennas of the initiator station.

Example 22 includes the subject matter of Example 21, and optionally, wherein a TXSS via the antenna of the plurality of antennas of the first wireless station comprises transmitting a plurality of responder Sector Sweep (SSW) frames via respective sectors of the antenna.

Example 23 includes the subject matter of Example 22, and optionally, wherein a responder SSW frame transmitted from an antenna of the responder station to an antenna of the initiator station comprises an indication of an initiator transmit sector of the antenna of the initiator station to transmit to the antenna of the responder station.

Example 24 includes the subject matter of any one of Examples 15-23, and optionally, wherein the apparatus is configured to cause the first wireless station to, during the RXSS ISS phase, sequentially perform a plurality of RXSS via respective antennas of the plurality of antennas of the first wireless station, and repeat the plurality of RXSS based on a number of antennas of the initiator station.

Example 25 includes the subject matter of any one of Examples 15-24, and optionally, wherein the apparatus is configured to cause the first wireless station to, during the RXSS RSS phase, sequentially transmit a plurality of responder Sector Sweep (SSW) transmission sequences via respective antennas of the plurality of antennas of the first wireless station, a responder SSW transmission sequence via the antenna of the first wireless station comprises transmitting a plurality of responder SSW frames via a first selected responder transmit sector of the antenna, and repeating transmission of the responder SSW frames via at least a second selected responder transmit sector of the antenna based on a number of antennas of the initiator station.

Example 26 includes the subject matter of Example 25, and optionally, wherein the first and second selected responder transmit sectors are based on the TXSS protocol.

Example 27 includes the subject matter of any one of Examples 1-26, and optionally, wherein the plurality of antennas of the first wireless station comprise two antennas, the SU-MIMO transmission comprises a 2×2 MIMO transmission.

Example 28 includes the subject matter of any one of Examples 1-27, and optionally, wherein the first wireless station is a Directional Multi-Gigabit (DMG) Station (STA).

Example 29 includes the subject matter of any one of Examples 1-28, and optionally, comprising the plurality of antennas.

Example 30 includes the subject matter of any one of Examples 1-29, and optionally, comprising a radio, a memory and a processor.

Example 31 includes a system of wireless communication comprising a first wireless station, the first wireless station comprising a plurality of antennas; a memory; a processor; a radio; and a controller configured to cause the first wireless station to perform a Transmit Sector Sweep (TXSS) protocol with a second wireless station over a directional frequency band using the plurality of antennas of the first wireless station, an antenna of the plurality of antennas of the first wireless station comprising a plurality of sectors; perform a Receive Sector Sweep (RXSS) protocol with the second wireless station over the directional frequency band using the plurality of antennas of the first wireless station; and based on the TXSS and RXSS protocols, configure the plurality of antennas of the first wireless station to communicate a Single-User (SU) Multiple-Input-Multiple-Output (MIMO) transmission with the second wireless station.

Example 32 includes the subject matter of Example 31, and optionally, wherein the TXSS protocol comprises a TXSS initiator sector sweep (ISS) phase of an initiator station, and a TXSS responder sector sweep (RSS) phase of a responder station, and wherein the RXSS protocol comprises an RXSS ISS phase of the initiator station and an RXSS RSS phase of the responder station.

Example 33 includes the subject matter of Example 32, and optionally, wherein the first wireless station is to operate as the initiator station.

Example 34 includes the subject matter of Example 33, and optionally, wherein the first wireless station is to, during the TXSS ISS phase, perform a sequence of a plurality of TXSS via the plurality of antennas of the first wireless station, respectively; and to repeat the sequence of the plurality of TXSS based on a number of antennas of the responder station.

Example 35 includes the subject matter of Example 34, and optionally, wherein a TXSS via the antenna of the plurality of antennas of the first wireless station comprises transmitting a plurality of initiator Sector Sweep (SSW) frames via respective sectors of the antenna.

Example 36 includes the subject matter of any one of Examples 33-35, and optionally, wherein the first wireless station is to, during the TXSS RSS phase, operate the plurality of antennas of the first wireless station at an omni-receive mode to receive a plurality of responder Sector Sweep (SSW) frames from the responder station.

Example 37 includes the subject matter of Example 36, and optionally, wherein a responder SSW frame received at an antenna of the initiator station from an antenna of the responder station comprises an indication of an initiator transmit sector of the antenna of the initiator station to transmit to the antenna of the responder station.

Example 38 includes the subject matter of Example 36 or 37, and optionally, wherein the first wireless station is to sequentially operate the plurality of antennas of the first wireless station at the omni-receive mode during the TXSS RSS phase.

Example 39 includes the subject matter of Example 36 or 37, and optionally, wherein the first wireless station is to simultaneously operate the plurality of antennas of the first wireless station at the omni-receive mode during the TXSS RSS phase.

Example 40 includes the subject matter of any one of Examples 36-39, and optionally, wherein the first wireless station is to determine, based on the responder SSW frames, a plurality of responder transmit sectors of a plurality of antennas of the responder station, and, subsequent to the TXSS RSS phase, to transmit to the responder station a feedback frame comprising an indication of the plurality of responder transmit sectors.

Example 41 includes the subject matter of Example 40, and optionally, wherein the plurality of responder transmit sectors correspond to a respective plurality of different combinations of one of the plurality of antennas of the first wireless station and one of the plurality of antennas of the responder station.

Example 42 includes the subject matter of any one of Examples 33-41, and optionally, wherein the first wireless station is to, during the RXSS ISS phase, sequentially transmit a plurality of initiator Sector Sweep (SSW) transmission sequences via respective antennas of the plurality of antennas of the first wireless station, an initiator SSW transmission sequence via the antenna of the first wireless station comprises transmitting a plurality of initiator SSW frames via a first selected initiator transmit sector of the antenna, and repeating transmission of the initiator SSW frames via at least a second selected initiator transmit sector of the antenna based on a number of antennas of the responder station.

Example 43 includes the subject matter of Example 42, and optionally, wherein the first and second selected initiator transmit sectors are based on the TXSS protocol.

Example 44 includes the subject matter of any one of Examples 33-43, and optionally, wherein the first wireless station is to, during the RXSS RSS phase, sequentially perform a plurality of RXSS via respective antennas of the plurality of antennas of the first wireless station, and repeat the plurality of RXSS based on a number of antennas of the responder station.

Example 45 includes the subject matter of Example 32, and optionally, wherein the first wireless station is to operate as the responder station.

Example 46 includes the subject matter of Example 45, and optionally, wherein the first wireless station is to, during the TXSS ISS phase, operate the plurality of antennas of the first wireless station at an omni-receive mode to receive a plurality of initiator Sector Sweep (SSW) frames from the initiator station.

Example 47 includes the subject matter of Example 46, and optionally, wherein the first wireless station is to determine, based on the initiator SSW frames, a plurality of initiator transmit sectors of a plurality of antennas of the initiator station, and, during the TXSS RSS phase, to transmit to the initiator station a plurality of responder SSW frames comprising an indication of the plurality of initiator transmit sectors.

Example 48 includes the subject matter of Example 47, and optionally, wherein the plurality of initiator transmit sectors correspond to a respective plurality of different combinations of one of the plurality of antennas of the first wireless station and one of a plurality of antennas of the initiator station.

Example 49 includes the subject matter of any one of Examples 46-48, and optionally, wherein the first wireless station is to sequentially operate the plurality of antennas of the first wireless station at the omni-receive mode during the TXSS ISS phase.

Example 50 includes the subject matter of any one of Examples 46-48, and optionally, wherein the first wireless station is to simultaneously operate the plurality of antennas of the first wireless station at the omni-receive mode during the TXSS ISS phase.

Example 51 includes the subject matter of any one of Examples 45-50, and optionally, wherein the first wireless station is to, during the TXSS RSS phase, perform a sequence of a plurality of TXSS via the plurality of antennas of the first wireless station, respectively; and to repeat the sequence of TXSS based on a number of antennas of the initiator station.

Example 52 includes the subject matter of Example 51, and optionally, wherein a TXSS via the antenna of the plurality of antennas of the first wireless station comprises transmitting a plurality of responder Sector Sweep (SSW) frames via respective sectors of the antenna.

Example 53 includes the subject matter of Example 52, and optionally, wherein a responder SSW frame transmitted from an antenna of the responder station to an antenna of the initiator station comprises an indication of an initiator transmit sector of the antenna of the initiator station to transmit to the antenna of the responder station.

Example 54 includes the subject matter of any one of Examples 45-53, and optionally, wherein the first wireless station is to, during the RXSS ISS phase, sequentially perform a plurality of RXSS via respective antennas of the plurality of antennas of the first wireless station, and repeat the plurality of RXSS based on a number of antennas of the initiator station.

Example 55 includes the subject matter of any one of Examples 45-54, and optionally, wherein the first wireless station is to, during the RXSS RSS phase, sequentially transmit a plurality of responder Sector Sweep (SSW) transmission sequences via respective antennas of the plurality of antennas of the first wireless station, a responder SSW transmission sequence via the antenna of the first wireless station comprises transmitting a plurality of responder SSW frames via a first selected responder transmit sector of the antenna, and repeating transmission of the responder SSW frames via at least a second selected responder transmit sector of the antenna based on a number of antennas of the initiator station.

Example 56 includes the subject matter of Example 55, and optionally, wherein the first and second selected responder transmit sectors are based on the TXSS protocol.

Example 57 includes the subject matter of any one of Examples 31-56, and optionally, wherein the plurality of antennas of the first wireless station comprise two antennas, the SU-MIMO transmission comprises a 2×2 MIMO transmission.

Example 58 includes the subject matter of any one of Examples 31-57, and optionally, wherein the first wireless station is a Directional Multi-Gigabit (DMG) Station (STA).

Example 59 includes a method to be performed at a first wireless station, the method comprising performing a Transmit Sector Sweep (TXSS) protocol with a second wireless station over a directional frequency band using a plurality of antennas of the first wireless station, an antenna of the plurality of antennas of the first wireless station comprising a plurality of sectors; performing a Receive Sector Sweep (RXSS) protocol with the second wireless station over the directional frequency band using the plurality of antennas of the first wireless station; and based on the TXSS and RXSS protocols, configuring the plurality of antennas of the first wireless station to communicate a Single-User (SU) Multiple-Input-Multiple-Output (MIMO) transmission with the second wireless station.

Example 60 includes the subject matter of Example 59, and optionally, wherein the TXSS protocol comprises a TXSS initiator sector sweep (ISS) phase of an initiator station, and a TXSS responder sector sweep (RSS) phase of a responder station, and wherein the RXSS protocol comprises an RXSS ISS phase of the initiator station and an RXSS RSS phase of the responder station.

Example 61 includes the subject matter of Example 60, and optionally, comprising operating the first wireless station as the initiator station.

Example 62 includes the subject matter of Example 61, and optionally, comprising, during the TXSS ISS phase, performing a sequence of a plurality of TXSS via the plurality of antennas of the first wireless station, respectively; and repeating the sequence of the plurality of TXSS based on a number of antennas of the responder station.

Example 63 includes the subject matter of Example 62, and optionally, wherein a TXSS via the antenna of the plurality of antennas of the first wireless station comprises transmitting a plurality of initiator Sector Sweep (SSW) frames via respective sectors of the antenna.

Example 64 includes the subject matter of any one of Examples 61-63, and optionally, comprising, during the TXSS RSS phase, operating the plurality of antennas of the first wireless station at an omni-receive mode to receive a plurality of responder Sector Sweep (SSW) frames from the responder station.

Example 65 includes the subject matter of Example 64, and optionally, wherein a responder SSW frame received at an antenna of the initiator station from an antenna of the responder station comprises an indication of an initiator transmit sector of the antenna of the initiator station to transmit to the antenna of the responder station.

Example 66 includes the subject matter of Example 64 or 65, and optionally, comprising sequentially operating the plurality of antennas of the first wireless station at the omni-receive mode during the TXSS RSS phase.

Example 67 includes the subject matter of Example 64 or 65, and optionally, comprising simultaneously operating the plurality of antennas of the first wireless station at the omni-receive mode during the TXSS RSS phase.

Example 68 includes the subject matter of any one of Examples 64-67, and optionally, comprising determining, based on the responder SSW frames, a plurality of responder transmit sectors of a plurality of antennas of the responder station, and, subsequent to the TXSS RSS phase, transmitting to the responder station a feedback frame comprising an indication of the plurality of responder transmit sectors.

Example 69 includes the subject matter of Example 68, and optionally, wherein the plurality of responder transmit sectors correspond to a respective plurality of different combinations of one of the plurality of antennas of the first wireless station and one of the plurality of antennas of the responder station.

Example 70 includes the subject matter of any one of Examples 61-69, and optionally, comprising, during the RXSS ISS phase, sequentially transmitting a plurality of initiator Sector Sweep (SSW) transmission sequences via respective antennas of the plurality of antennas of the first wireless station, an initiator SSW transmission sequence via the antenna of the first wireless station comprises transmitting a plurality of initiator SSW frames via a first selected initiator transmit sector of the antenna, and repeating transmission of the initiator SSW frames via at least a second selected initiator transmit sector of the antenna based on a number of antennas of the responder station.

Example 71 includes the subject matter of Example 70, and optionally, wherein the first and second selected initiator transmit sectors are based on the TXSS protocol.

Example 72 includes the subject matter of any one of Examples 61-71, and optionally, comprising, during the RXSS RSS phase, sequentially performing a plurality of RXSS via respective antennas of the plurality of antennas of the first wireless station, and repeating the plurality of RXSS based on a number of antennas of the responder station.

Example 73 includes the subject matter of Example 60, and optionally, comprising operating the first wireless station as the responder station.

Example 74 includes the subject matter of Example 73, and optionally, comprising, during the TXSS ISS phase, operating the plurality of antennas of the first wireless station at an omni-receive mode to receive a plurality of initiator Sector Sweep (SSW) frames from the initiator station.

Example 75 includes the subject matter of Example 74, and optionally, comprising determining, based on the initiator SSW frames, a plurality of initiator transmit sectors of a plurality of antennas of the initiator station, and, during the TXSS RSS phase, transmitting to the initiator station a plurality of responder SSW frames comprising an indication of the plurality of initiator transmit sectors.

Example 76 includes the subject matter of Example 75, and optionally, wherein the plurality of initiator transmit sectors correspond to a respective plurality of different combinations of one of the plurality of antennas of the first wireless station and one of a plurality of antennas of the initiator station.

Example 77 includes the subject matter of any one of Examples 74-76, and optionally, comprising sequentially operating the plurality of antennas of the first wireless station at the omni-receive mode during the TXSS ISS phase.

Example 78 includes the subject matter of any one of Examples 74-76, and optionally, comprising simultaneously operating the plurality of antennas of the first wireless station at the omni-receive mode during the TXSS ISS phase.

Example 79 includes the subject matter of any one of Examples 73-78, and optionally, comprising, during the TXSS RSS phase, performing a sequence of a plurality of TXSS via the plurality of antennas of the first wireless station, respectively; and repeating the sequence of TXSS based on a number of antennas of the initiator station.

Example 80 includes the subject matter of Example 79, and optionally, wherein a TXSS via the antenna of the plurality of antennas of the first wireless station comprises transmitting a plurality of responder Sector Sweep (SSW) frames via respective sectors of the antenna.

Example 81 includes the subject matter of Example 80, and optionally, wherein a responder SSW frame transmitted from an antenna of the responder station to an antenna of the initiator station comprises an indication of an initiator transmit sector of the antenna of the initiator station to transmit to the antenna of the responder station.

Example 82 includes the subject matter of any one of Examples 73-81, and optionally, comprising, during the RXSS ISS phase, sequentially performing a plurality of RXSS via respective antennas of the plurality of antennas of the first wireless station, and repeating the plurality of RXSS based on a number of antennas of the initiator station.

Example 83 includes the subject matter of any one of Examples 73-82, and optionally, comprising, during the RXSS RSS phase, sequentially transmitting a plurality of responder Sector Sweep (SSW) transmission sequences via respective antennas of the plurality of antennas of the first wireless station, a responder SSW transmission sequence via the antenna of the first wireless station comprises transmitting a plurality of responder SSW frames via a first selected responder transmit sector of the antenna, and repeating transmission of the responder SSW frames via at least a second selected responder transmit sector of the antenna based on a number of antennas of the initiator station.

Example 84 includes the subject matter of Example 83, and optionally, wherein the first and second selected responder transmit sectors are based on the TXSS protocol.

Example 85 includes the subject matter of any one of Examples 59-84, and optionally, wherein the plurality of antennas of the first wireless station comprise two antennas, the SU-MIMO transmission comprises a 2×2 MIMO transmission.

Example 86 includes the subject matter of any one of Examples 59-85, and optionally, wherein the first wireless station is a Directional Multi-Gigabit (DMG) Station (STA).

Example 87 includes a product including one or more tangible computer-readable non-transitory storage media comprising computer-executable instructions operable to, when executed by at least one computer processor, enable the at least one computer processor to implement operations at a first wireless station, the operations comprising performing a Transmit Sector Sweep (TXSS) protocol with a second wireless station over a directional frequency band using a plurality of antennas of the first wireless station, an antenna of the plurality of antennas of the first wireless station comprising a plurality of sectors; performing a Receive Sector Sweep (RXSS) protocol with the second wireless station over the directional frequency band using the plurality of antennas of the first wireless station; and based on the TXSS and RXSS protocols, configuring the plurality of antennas of the first wireless station to communicate a Single-User (SU) Multiple-Input-Multiple-Output (MIMO) transmission with the second wireless station.

Example 88 includes the subject matter of Example 87, and optionally, wherein the TXSS protocol comprises a TXSS initiator sector sweep (ISS) phase of an initiator station, and a TXSS responder sector sweep (RSS) phase of a responder station, and wherein the RXSS protocol comprises an RXSS ISS phase of the initiator station and an RXSS RSS phase of the responder station.

Example 89 includes the subject matter of Example 88, and optionally, wherein the operations comprise operating the first wireless station as the initiator station.

Example 90 includes the subject matter of Example 89, and optionally, wherein the operations comprise, during the TXSS ISS phase, performing a sequence of a plurality of TXSS via the plurality of antennas of the first wireless station, respectively; and repeating the sequence of the plurality of TXSS based on a number of antennas of the responder station.

Example 91 includes the subject matter of Example 90, and optionally, wherein a TXSS via the antenna of the plurality of antennas of the first wireless station comprises transmitting a plurality of initiator Sector Sweep (SSW) frames via respective sectors of the antenna.

Example 92 includes the subject matter of any one of Examples 89-91, and optionally, wherein the operations comprise, during the TXSS RSS phase, operating the plurality of antennas of the first wireless station at an omni-receive mode to receive a plurality of responder Sector Sweep (SSW) frames from the responder station.

Example 93 includes the subject matter of Example 92, and optionally, wherein a responder SSW frame received at an antenna of the initiator station from an antenna of the responder station comprises an indication of an initiator transmit sector of the antenna of the initiator station to transmit to the antenna of the responder station.

Example 94 includes the subject matter of Example 92 or 93, and optionally, wherein the operations comprise sequentially operating the plurality of antennas of the first wireless station at the omni-receive mode during the TXSS RSS phase.

Example 95 includes the subject matter of Example 92 or 93, and optionally, wherein the operations comprise simultaneously operating the plurality of antennas of the first wireless station at the omni-receive mode during the TXSS RSS phase.

Example 96 includes the subject matter of any one of Examples 92-95, and optionally, wherein the operations comprise determining, based on the responder SSW frames, a plurality of responder transmit sectors of a plurality of antennas of the responder station, and, subsequent to the TXSS RSS phase, transmitting to the responder station a feedback frame comprising an indication of the plurality of responder transmit sectors.

Example 97 includes the subject matter of Example 96, and optionally, wherein the plurality of responder transmit sectors correspond to a respective plurality of different combinations of one of the plurality of antennas of the first wireless station and one of the plurality of antennas of the responder station.

Example 98 includes the subject matter of any one of Examples 89-97, and optionally, wherein the operations comprise, during the RXSS ISS phase, sequentially transmitting a plurality of initiator Sector Sweep (SSW) transmission sequences via respective antennas of the plurality of antennas of the first wireless station, an initiator SSW transmission sequence via the antenna of the first wireless station comprises transmitting a plurality of initiator SSW frames via a first selected initiator transmit sector of the antenna, and repeating transmission of the initiator SSW frames via at least a second selected initiator transmit sector of the antenna based on a number of antennas of the responder station.

Example 99 includes the subject matter of Example 98, and optionally, wherein the first and second selected initiator transmit sectors are based on the TXSS protocol.

Example 100 includes the subject matter of any one of Examples 89-99, and optionally, wherein the operations comprise, during the RXSS RSS phase, sequentially performing a plurality of RXSS via respective antennas of the plurality of antennas of the first wireless station, and repeating the plurality of RXSS based on a number of antennas of the responder station.

Example 101 includes the subject matter of Example 88, and optionally, wherein the operations comprise operating the first wireless station as the responder station.

Example 102 includes the subject matter of Example 101, and optionally, wherein the operations comprise, during the TXSS ISS phase, operating the plurality of antennas of the first wireless station at an omni-receive mode to receive a plurality of initiator Sector Sweep (SSW) frames from the initiator station.

Example 103 includes the subject matter of Example 102, and optionally, wherein the operations comprise determining, based on the initiator SSW frames, a plurality of initiator transmit sectors of a plurality of antennas of the initiator station, and, during the TXSS RSS phase, transmitting to the initiator station a plurality of responder SSW frames comprising an indication of the plurality of initiator transmit sectors.

Example 104 includes the subject matter of Example 103, and optionally, wherein the plurality of initiator transmit sectors correspond to a respective plurality of different combinations of one of the plurality of antennas of the first wireless station and one of a plurality of antennas of the initiator station.

Example 105 includes the subject matter of any one of Examples 102-104, and optionally, wherein the operations comprise sequentially operating the plurality of antennas of the first wireless station at the omni-receive mode during the TXSS ISS phase.

Example 106 includes the subject matter of any one of Examples 102-104, and optionally, wherein the operations comprise simultaneously operating the plurality of antennas of the first wireless station at the omni-receive mode during the TXSS ISS phase.

Example 107 includes the subject matter of any one of Examples 101-106, and optionally, wherein the operations comprise, during the TXSS RSS phase, performing a sequence of a plurality of TXSS via the plurality of antennas of the first wireless station, respectively; and repeating the sequence of TXSS based on a number of antennas of the initiator station.

Example 108 includes the subject matter of Example 107, and optionally, wherein a TXSS via the antenna of the plurality of antennas of the first wireless station comprises transmitting a plurality of responder Sector Sweep (SSW) frames via respective sectors of the antenna.

Example 109 includes the subject matter of Example 108, and optionally, wherein a responder SSW frame transmitted from an antenna of the responder station to an antenna of the initiator station comprises an indication of an initiator transmit sector of the antenna of the initiator station to transmit to the antenna of the responder station.

Example 110 includes the subject matter of any one of Examples 101-109, and optionally, wherein the operations comprise, during the RXSS ISS phase, sequentially performing a plurality of RXSS via respective antennas of the plurality of antennas of the first wireless station, and repeating the plurality of RXSS based on a number of antennas of the initiator station.

Example 111 includes the subject matter of any one of Examples 101-110, and optionally, wherein the operations comprise, during the RXSS RSS phase, sequentially transmitting a plurality of responder Sector Sweep (SSW) transmission sequences via respective antennas of the plurality of antennas of the first wireless station, a responder SSW transmission sequence via the antenna of the first wireless station comprises transmitting a plurality of responder SSW frames via a first selected responder transmit sector of the antenna, and repeating transmission of the responder SSW frames via at least a second selected responder transmit sector of the antenna based on a number of antennas of the initiator station.

Example 112 includes the subject matter of Example 111, and optionally, wherein the first and second selected responder transmit sectors are based on the TXSS protocol.

Example 113 includes the subject matter of any one of Examples 87-112, and optionally, wherein the plurality of antennas of the first wireless station comprise two antennas, the SU-MIMO transmission comprises a 2×2 MIMO transmission.

Example 114 includes the subject matter of any one of Examples 87-113, and optionally, wherein the first wireless station is a Directional Multi-Gigabit (DMG) Station (STA).

Example 115 includes an apparatus of wireless communication by a first wireless station, the apparatus comprising means for performing a Transmit Sector Sweep (TXSS) protocol with a second wireless station over a directional frequency band using a plurality of antennas of the first wireless station, an antenna of the plurality of antennas of the first wireless station comprising a plurality of sectors; means for performing a Receive Sector Sweep (RXSS) protocol with the second wireless station over the directional frequency band using the plurality of antennas of the first wireless station; and means for, based on the TXSS and RXSS protocols, configuring the plurality of antennas of the first wireless station to communicate a Single-User (SU) Multiple-Input-Multiple-Output (MIMO) transmission with the second wireless station.

Example 116 includes the subject matter of Example 115, and optionally, wherein the TXSS protocol comprises a TXSS initiator sector sweep (ISS) phase of an initiator station, and a TXSS responder sector sweep (RSS) phase of a responder station, and wherein the RXSS protocol comprises an RXSS ISS phase of the initiator station and an RXSS RSS phase of the responder station.

Example 117 includes the subject matter of Example 116, and optionally, comprising means for operating the first wireless station as the initiator station.

Example 118 includes the subject matter of Example 117, and optionally, comprising, during the TXSS ISS phase, means for performing a sequence of a plurality of TXSS via the plurality of antennas of the first wireless station, respectively; and repeating the sequence of the plurality of TXSS based on a number of antennas of the responder station.

Example 119 includes the subject matter of Example 118, and optionally, wherein a TXSS via the antenna of the plurality of antennas of the first wireless station comprises transmitting a plurality of initiator Sector Sweep (SSW) frames via respective sectors of the antenna.

Example 120 includes the subject matter of any one of Examples 117-119, and optionally, comprising, during the TXSS RSS phase, means for operating the plurality of antennas of the first wireless station at an omni-receive mode to receive a plurality of responder Sector Sweep (SSW) frames from the responder station.

Example 121 includes the subject matter of Example 120, and optionally, wherein a responder SSW frame received at an antenna of the initiator station from an antenna of the responder station comprises an indication of an initiator transmit sector of the antenna of the initiator station to transmit to the antenna of the responder station.

Example 122 includes the subject matter of Example 120 or 121, and optionally, comprising means for sequentially operating the plurality of antennas of the first wireless station at the omni-receive mode during the TXSS RSS phase.

Example 123 includes the subject matter of Example 120 or 121, and optionally, comprising means for simultaneously operating the plurality of antennas of the first wireless station at the omni-receive mode during the TXSS RSS phase.

Example 124 includes the subject matter of any one of Examples 120-123, and optionally, comprising means for determining, based on the responder SSW frames, a plurality of responder transmit sectors of a plurality of antennas of the responder station, and, subsequent to the TXSS RSS phase, transmitting to the responder station a feedback frame comprising an indication of the plurality of responder transmit sectors.

Example 125 includes the subject matter of Example 124, and optionally, wherein the plurality of responder transmit sectors correspond to a respective plurality of different combinations of one of the plurality of antennas of the first wireless station and one of the plurality of antennas of the responder station.

Example 126 includes the subject matter of any one of Examples 117-125, and optionally, comprising, during the RXSS ISS phase, means for sequentially transmitting a plurality of initiator Sector Sweep (SSW) transmission sequences via respective antennas of the plurality of antennas of the first wireless station, an initiator SSW transmission sequence via the antenna of the first wireless station comprises transmitting a plurality of initiator SSW frames via a first selected initiator transmit sector of the antenna, and repeating transmission of the initiator SSW frames via at least a second selected initiator transmit sector of the antenna based on a number of antennas of the responder station.

Example 127 includes the subject matter of Example 126, and optionally, wherein the first and second selected initiator transmit sectors are based on the TXSS protocol.

Example 128 includes the subject matter of any one of Examples 117-127, and optionally, comprising, during the RXSS RSS phase, means for sequentially performing a plurality of RXSS via respective antennas of the plurality of antennas of the first wireless station, and repeating the plurality of RXSS based on a number of antennas of the responder station.

Example 129 includes the subject matter of Example 116, and optionally, comprising means for operating the first wireless station as the responder station.

Example 130 includes the subject matter of Example 129, and optionally, comprising, during the TXSS ISS phase, means for operating the plurality of antennas of the first wireless station at an omni-receive mode to receive a plurality of initiator Sector Sweep (SSW) frames from the initiator station.

Example 131 includes the subject matter of Example 130, and optionally, comprising means for determining, based on the initiator SSW frames, a plurality of initiator transmit sectors of a plurality of antennas of the initiator station, and, during the TXSS RSS phase, transmitting to the initiator station a plurality of responder SSW frames comprising an indication of the plurality of initiator transmit sectors.

Example 132 includes the subject matter of Example 131, and optionally, wherein the plurality of initiator transmit sectors correspond to a respective plurality of different combinations of one of the plurality of antennas of the first wireless station and one of a plurality of antennas of the initiator station.

Example 133 includes the subject matter of any one of Examples 130-132, and optionally, comprising means for sequentially operating the plurality of antennas of the first wireless station at the omni-receive mode during the TXSS ISS phase.

Example 134 includes the subject matter of any one of Examples 130-132, and optionally, comprising means for simultaneously operating the plurality of antennas of the first wireless station at the omni-receive mode during the TXSS ISS phase.

Example 135 includes the subject matter of any one of Examples 129-134, and optionally, comprising, during the TXSS RSS phase, means for performing a sequence of a plurality of TXSS via the plurality of antennas of the first wireless station, respectively; and repeating the sequence of TXSS based on a number of antennas of the initiator station.

Example 136 includes the subject matter of Example 135, and optionally, wherein a TXSS via the antenna of the plurality of antennas of the first wireless station comprises transmitting a plurality of responder Sector Sweep (SSW) frames via respective sectors of the antenna.

Example 137 includes the subject matter of Example 136, and optionally, wherein a responder SSW frame transmitted from an antenna of the responder station to an antenna of the initiator station comprises an indication of an initiator transmit sector of the antenna of the initiator station to transmit to the antenna of the responder station.

Example 138 includes the subject matter of any one of Examples 129-137, and optionally, comprising, during the RXSS ISS phase, means for sequentially performing a plurality of RXSS via respective antennas of the plurality of antennas of the first wireless station, and repeating the plurality of RXSS based on a number of antennas of the initiator station.

Example 139 includes the subject matter of any one of Examples 129-138, and optionally, comprising, during the RXSS RSS phase, means for sequentially transmitting a plurality of responder Sector Sweep (SSW) transmission sequences via respective antennas of the plurality of antennas of the first wireless station, a responder SSW transmission sequence via the antenna of the first wireless station comprises transmitting a plurality of responder SSW frames via a first selected responder transmit sector of the antenna, and repeating transmission of the responder SSW frames via at least a second selected responder transmit sector of the antenna based on a number of antennas of the initiator station.

Example 140 includes the subject matter of Example 139, and optionally, wherein the first and second selected responder transmit sectors are based on the TXSS protocol.

Example 141 includes the subject matter of any one of Examples 115-140, and optionally, wherein the plurality of antennas of the first wireless station comprise two antennas, the SU-MIMO transmission comprises a 2×2 MIMO transmission.

Example 142 includes the subject matter of any one of Examples 115-141, and optionally, wherein the first wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first wireless station to operate as an initiator station to:

perform a Transmit Sector Sweep (TXSS) protocol with a second wireless station as a responder station over a directional frequency band using a plurality of antennas of the first wireless station, an antenna of the plurality of antennas of the first wireless station comprising a plurality of sectors, the TXSS protocol comprising a TXSS initiator sector sweep (ISS) phase of the initiator station, and a TXSS responder sector sweep (RSS) phase of the responder station, the apparatus configured to cause the first wireless station to, during the TXSS ISS phase, perform a sequence of a plurality of TXSS via the plurality of antennas of the first wireless station, respectively, and to repeat the sequence of the plurality of TXSS based on a number of antennas of the responder station;

perform a Receive Sector Sweep (RXSS) protocol with the second wireless station over the directional frequency band using the plurality of antennas of the first wireless station, the RXSS protocol comprising an RXSS ISS phase of the initiator station and an RXSS RSS phase of the responder station, wherein, during the RXSS ISS phase, the initiator station is to sequentially transmit a plurality of initiator Sector Sweep (SSW) transmission sequences via the plurality of antennas of the first wireless station, respectively, the initiator station to perform an initiator SSW transmission sequence via a particular antenna of the plurality of antennas of the first wireless station by transmitting a plurality of initiator SSW frames via a first selected initiator transmit sector of the particular antenna, and repeating transmission of the initiator SSW frames via at least a second selected initiator transmit sector of the particular antenna based on the number of antennas of the responder station; and based on the TXSS and RXSS protocols, configure the plurality of antennas of the first wireless station to communicate a Single-User (SU) Multiple-Input-Multiple-Output (MIMO) transmission with the second wireless station.

2. The apparatus of claim 1 configured to cause the first wireless station to, during the TXSS RSS phase, operate the plurality of antennas of the first wireless station at an omni-receive mode to receive a plurality of responder Sector Sweep (SSW) frames from the responder station.

3. The apparatus of claim 2 configured to cause the first wireless station to determine, based on the responder SSW frames, a plurality of responder transmit sectors of a plurality of antennas of the responder station, and, subsequent to the TXSS RSS phase, to transmit to the responder station a feedback frame comprising an indication of the plurality of responder transmit sectors.

4. The apparatus of claim 3, wherein the plurality of responder transmit sectors correspond to a respective plurality of different combinations of one of the plurality of antennas of the first wireless station and one of the plurality of antennas of the responder station.

5. The apparatus of claim 1 configured to cause the first wireless station to, during the RXSS RSS phase, sequentially perform a plurality of RXSS via respective antennas of the plurality of antennas of the first wireless station, and repeat the plurality of RXSS based on the number of antennas of the responder station.

6. The apparatus of claim 1 comprising the plurality of antennas of the first wireless station, a radio, a memory, and a processor.

7. An apparatus comprising logic and circuitry configured to cause a first wireless station to operate as a responder station to:

perform a Transmit Sector Sweep (TXSS) protocol with a second wireless station as an initiator station over a directional frequency band using a plurality of antennas of the first wireless station, an antenna of the plurality of antennas of the first wireless station comprising a plurality of sectors, the TXSS protocol comprising a TXSS initiator sector sweep (ISS) phase of the initiator station, and a TXSS responder sector sweep (RSS) phase of the responder station, the apparatus configured to cause the first wireless station to, during the TXSS RSS phase, perform a sequence of a plurality of TXSS via the plurality of antennas of the first wireless station, respectively, and to repeat the sequence of TXSS based on a number of antennas of the initiator station;

perform a Receive Sector Sweep (RXSS) protocol with the second wireless station over the directional frequency band using the plurality of antennas of the first wireless station, the RXSS protocol comprising an RXSS ISS phase of the initiator station and an RXSS RSS phase of the responder station, wherein, during the RXSS RSS phase, the responder station is to sequentially transmit a plurality of responder Sector Sweep (SSW) transmission sequences via the plurality of antennas of the first wireless station, respectively, the responder station to perform a responder SSW transmission sequence via a particular antenna of the plurality of antennas of the first wireless station by transmitting a plurality of responder SSW frames via a first selected responder transmit sector of the particular antenna, and repeating transmission of the responder SSW frames via at least a second selected responder transmit sector of the particular antenna based on the number of antennas of the initiator station; and based on the TXSS and RXSS protocols, configure the plurality of antennas of the first wireless station to communicate a Single-User (SU) Multiple-Input-Multiple-Output (MIMO) transmission with the second wireless station.

8. The apparatus of claim 7 configured to cause the first wireless station to, during the TXSS ISS phase, operate the plurality of antennas of the first wireless station at an omni-receive mode to receive a plurality of initiator Sector Sweep (SSW) frames from the initiator station.

9. The apparatus of claim 8 configured to cause the first wireless station to determine, based on the initiator SSW frames, a plurality of initiator transmit sectors of a plurality of antennas of the initiator station, and, during the TXSS RSS phase to transmit to the initiator station a plurality of responder SSW frames comprising an indication of the plurality of initiator transmit sectors.

10. The apparatus of claim 9, wherein the plurality of initiator transmit sectors correspond to a respective plurality of different combinations of one of the plurality of antennas of the first wireless station and one of a plurality of antennas of the initiator station.

11. The apparatus of claim 7, wherein a TXSS via the antenna of said plurality of antennas of the first wireless station comprises transmitting a plurality of responder Sector Sweep (SSW) frames via respective sectors of the antenna.

12. The apparatus of claim 11, wherein a responder SSW frame transmitted from an antenna of the responder station to an antenna of the initiator station comprises an indication of an initiator transmit sector of the antenna of the initiator station to transmit to the antenna of the responder station.

13. The apparatus of claim 7 configured to cause the first wireless station to, during the RXSS ISS phase, sequentially perform a plurality of RXSS via respective antennas of the plurality of antennas of the first wireless station, and repeat the plurality of RXSS based on the number of antennas of the initiator station.

14. The apparatus of claim 7, wherein the plurality of antennas of the first wireless station comprises two antennas, the SU-MIMO transmission comprises a 2×2 MIMO transmission.

15. The apparatus of claim 7 comprising the plurality of antennas of the first wireless station, a radio, a memory, and a processor.

16. A product including one or more tangible computer-readable non-transitory storage media comprising computer-executable instructions operable to, when executed by at least one processor, enable the at least one processor to cause a first wireless station to operate as an initiator station to:
perform a Transmit Sector Sweep (TXSS) protocol with a second wireless station as a responder station over a directional frequency band using a plurality of antennas of the first wireless station, an antenna of the plurality of antennas of the first wireless station comprising a plurality of sectors, the TXSS protocol comprising a TXSS initiator sector sweep (ISS) phase of the initiator station, and a TXSS responder sector sweep (RSS) phase of the responder station, the instructions, when executed, cause the first wireless station to, during the TXSS ISS phase, perform a sequence of a plurality of TXSS via the plurality of antennas of the first wireless station, respectively, and to repeat the sequence of the plurality of TXSS based on a number of antennas of the responder station;

perform a Receive Sector Sweep (RXSS) protocol with the second wireless station over the directional frequency band using the plurality of antennas of the first wireless station, the RXSS protocol comprising an RXSS ISS phase of the initiator station and an RXSS RSS phase of the responder station, wherein, the instructions when executed, cause the initiator station to, during the PASS ISS phase, sequentially transmit a plurality of initiator Sector Sweep (SSW) transmission sequences via the plurality of antennas of the first wireless station, respectively, the instructions, when executed, to cause the initiator station to perform an initiator SSW transmission sequence via a particular antenna of the plurality of antennas of the first wireless station by transmitting a plurality of initiator SSW frames via a first selected initiator transmit sector of the particular antenna, and repeating transmission of the initiator SSW frames via at least a second selected initiator transmit sector of the particular antenna based on the number of antennas of the responder station; and based on the TXSS and RXSS protocols, configure the plurality of antennas of the first wireless station to communicate a Single-User (SU) Multiple-Input-Multiple-Output (MIMO) transmission with the second wireless station.

17. The product of claim 16, wherein the instructions, when executed, cause the first wireless station to, during the TXSS RSS phase, operate the plurality of antennas of the first wireless station at an omni-receive mode to receive a plurality of responder Sector Sweep (SSW) frames from the responder station.

18. The product of claim 17, wherein the instructions, when executed, cause the first wireless station to determine, based on the responder SSW frames, a plurality of responder transmit sectors of a plurality of antennas of the responder station, and, subsequent to the TXSS RSS phase, to transmit to the responder station a feedback frame comprising an indication of the plurality of responder transmit sectors.

19. The product of claim 18, wherein the plurality of responder transmit sectors correspond to a respective plurality of different combinations of one of the plurality of antennas of the first wireless station and one of the plurality of antennas of the responder station.

20. The product of claim 16, wherein the instructions, when executed, cause the first wireless station to, during the RXSS RSS phase, sequentially perform a plurality of RXSS via respective antennas of the plurality of antennas of the first wireless station, and repeat the plurality of RXSS based on the number of antennas of the responder station.

* * * * *

UNITED STATES PATENT AND TRADEMARK OFFICE
CERTIFICATE OF CORRECTION

PATENT NO.        : 10,651,908 B2
APPLICATION NO.   : 15/766947
DATED             : May 12, 2020
INVENTOR(S)       : Alexander Maltsev et al.

Page 1 of 1

It is certified that error appears in the above-identified patent and that said Letters Patent is hereby corrected as shown below:

In the Claims

In Column 48, Line 15, in Claim 16, delete "during the PASS ISS" and insert --during the RXSS ISS--, therefor.

Signed and Sealed this
Eighteenth Day of August, 2020

Andrei Iancu
*Director of the United States Patent and Trademark Office*